US012771716B2

(12) United States Patent
Tsirkin et al.

(10) Patent No.: US 12,771,716 B2
(45) Date of Patent: Oct. 20, 2026

(54) MALICIOUS PACKET FILTERING IN A VIRTUALIZATION SYSTEM

(71) Applicant: Red Hat, Inc., Raleigh, NC (US)

(72) Inventors: Michael Tsirkin, Haifa (IL); Jiri Benc, Prague (CZ); Aaron Conole, Lowell, MA (US)

(73) Assignee: Red Hat, Inc., Raleigh, NC (US)

( * ) Notice: Subject to any disclaimer, the term of this patent is extended or adjusted under 35 U.S.C. 154(b) by 980 days.

(21) Appl. No.: 17/592,622

(22) Filed: Feb. 4, 2022

(65) Prior Publication Data

US 2022/0159036 A1 May 19, 2022

Related U.S. Application Data

(63) Continuation-in-part of application No. 15/687,300, filed on Aug. 25, 2017, now Pat. No. 11,265,291.

(51) Int. Cl.
*H04L 9/40* (2022.01)
*G06F 9/455* (2018.01)

(52) U.S. Cl.
CPC ...... *H04L 63/1466* (2013.01); *G06F 9/45558* (2013.01); *H04L 63/0245* (2013.01); *G06F 2009/45595* (2013.01)

(58) Field of Classification Search
None
See application file for complete search history.

(56) References Cited

U.S. PATENT DOCUMENTS 7,496,961 B2 2/2009 Zimmer et al.
7,640,591 B1 12/2009 Tripathi et al.
8,250,641 B2 8/2012 Morgan et al.
8,938,611 B1 * 1/2015 Zhu ...................... G06F 21/575 713/153
9,166,988 B1 * 10/2015 Shin ...................... H04L 63/20
9,183,021 B2 11/2015 Dinn
9,276,875 B2 3/2016 Dong et al.
9,419,897 B2 8/2016 Cherian et al.
(Continued)

FOREIGN PATENT DOCUMENTS

CN 103023912 A 4/2013

OTHER PUBLICATIONS

Santhosh, K.K., Dogra, D.P. and Roy, P.P., 2020. Anomaly detection in road traffic using visual surveillance: A survey. ACM Computing Surveys (CSUR), 53(6), pp. 1-26. (Year: 2020).*
(Continued)

*Primary Examiner* — Luu T Pham
*Assistant Examiner* — Edward X Long
(74) *Attorney, Agent, or Firm* — Womble Bond Dickinson (US) LLP

(57) ABSTRACT

A method includes receiving, by a processing device, a first packet addressed to a first virtualized execution environment, determining, by the processing device, whether the first packet has similar characteristics with a second packet by applying a first filtering rule to the first packet, wherein the first filtering rule is generated in view of characteristics of the second packet, and wherein the second packet is stored in a first filtering queue of a second virtualized execution environment, and responsive to determining that the first packet is similar to the second packet, discarding, by the processing device, the first packet.

20 Claims, 21 Drawing Sheets

(56) References Cited

U.S. PATENT DOCUMENTS

| | | | | |
|---|---|---|---|---|
| 9,557,992 | B2 | 1/2017 | Tashiro et al. | |
| 10,423,358 | B1 | 9/2019 | Foo | |
| 2006/0282660 | A1* | 12/2006 | Varghese | G07F 7/1083 713/155 |
| 2012/0185633 | A1 | 7/2012 | Sano | |
| 2012/0304244 | A1* | 11/2012 | Xie | H04L 63/1425 726/1 |
| 2013/0227556 | A1 | 8/2013 | Tsirkin et al. | |
| 2014/0269379 | A1 | 9/2014 | Holbrook et al. | |
| 2014/0296379 | A1 | 10/2014 | Christiano et al. | |
| 2014/0317677 | A1 | 10/2014 | Vaidya et al. | |
| 2015/0207662 | A1 | 7/2015 | Basso et al. | |
| 2016/0080414 | A1 | 3/2016 | Kolton et al. | |
| 2016/0277447 | A1 | 9/2016 | Pope et al. | |
| 2016/0299777 | A1 | 10/2016 | Tsirkin | |
| 2016/0380865 | A1 | 12/2016 | Dubal et al. | |
| 2017/0093677 | A1 | 3/2017 | Skerry et al. | |
| 2017/0104679 | A1 | 4/2017 | Sunavala et al. | |
| 2017/0155724 | A1 | 6/2017 | Haddad et al. | |
| 2017/0171159 | A1* | 6/2017 | Kumar | G06F 9/45558 |
| 2017/0177396 | A1 | 6/2017 | Palermo et al. | |
| 2017/0289068 | A1 | 10/2017 | Palermo et al. | |
| 2018/0254981 | A1 | 9/2018 | Babu et al. | |
| 2019/0044812 | A1 | 2/2019 | Loftus et al. | |
| 2019/0050273 | A1 | 2/2019 | Tamir et al. | |
| 2019/0068491 | A1 | 2/2019 | Tsirkin | |
| 2019/0205140 | A1 | 7/2019 | Grisenthwaite et al. | |
| 2020/0341885 | A1 | 10/2020 | Plummer et al. | |

OTHER PUBLICATIONS

Gulomov, et al., May 2025, Hybrid Traffic Filtering and Anomaly Detection Model for Next-Generation Networks. In 2025 IEEE Ural-Siberian Conference on Biomedical Engineering, Radioelectronics and Information Technology (USBEREIT) (pp (Year: 2025).*

USPTO, Office Action for U.S. Appl. No. 16/551,522, mailed Jul. 29, 2022.

USPTO, Notice of Allowance for U.S. Appl. No. 16/551,522, mailed Mar. 8, 2023.

USPTO, Office Action for U.S. Appl. No. 15/687,300, mailed Jun. 13, 2019.

USPTO, Final Office Action for U.S. Appl. No. 15/687,300, mailed Nov. 21, 2019.

USPTO, Advisory Action for U.S. Appl. No. 15/687,300, mailed Feb. 13, 2020.

USPTO, Office Action for U.S. Appl. No. 15/687,300, mailed Jul. 8, 2020.

USPTO, Final Office Action for U.S. Appl. No. 15/687,300, mailed Feb. 11, 2021.

USPTO, Advisory Action for U.S. Appl. No. 15/687,300, mailed May 19, 2021.

USPTO, Notice of Allowance for U.S. Appl. No. 15/687,300, mailed Oct. 18, 2021.

USPTO, Office Action for U.S. Appl. No. 15/688,794, mailed Apr. 4, 2019.

USPTO, Notice of Allowance for U.S. Appl. No. 15/688,794, mailed Nov. 20, 2019.

USPTO, Office Action for U.S. Appl. No. 16/551,522, mailed Jun. 14, 2021.

USPTO, Final Office Action for U.S. Appl. No. 16/551,522, mailed Dec. 3, 2021.

* cited by examiner

MALICIOUS PACKET FILTERING IN A VIRTUALIZATION SYSTEM

RELATED APPLICATIONS

This application is a continuation-in-part of U.S. patent application Ser. No. 15/687,300, filed on Aug. 25, 2017 and entitled "Malicious Packet Filtering by a Hypervisor", the entire contents of which are incorporated by reference herein.

TECHNICAL FIELD

The present disclosure is generally related to virtualization, and is more specifically related to malicious packet filtering in a virtualization system.

BACKGROUND

Data centers may include clusters consisting of multiple hosts (e.g., physical servers) in racks. Hypervisors may operate on each host to create and run virtual machines (VMs). VMs are virtualized execution environments that can emulate computer systems and may be referred to as guest machines. The hosts in the clusters may be connected to each other via one or more wired (e.g., Ethernet) and/or wireless (e.g., WiFi) networks (e.g., the Internet, local area network). Additionally, the hosts may be connected to other devices external to the clusters via the networks. In some instances, malicious packets may be sent to the various virtual machines executing via hypervisors on the hosts in an attempt to perform undesirable activity (e.g., deny service, install a virus, misappropriate data, etc.).

Another type of virtualized execution environment is a container. Generally, a container refers to (1) an executable software package that bundles the executable code for one or more applications together with the related configuration files, libraries, and dependencies, and (2) isolated execution environment for running the executable code retrieved from the executable software package. The isolated execution environment may be provided by an isolated instance of the user space (i.e., unprivileged execution environment), while possibly sharing the kernel space (i.e., privileged execution environment in which at least part of the operating system kernel runs) with other execution environments (e.g., other containers). Containers with their respective applications (i.e., containerized applications) can be managed by a supervisor. A supervisor can refer to a software module that manages multiple processes and/or applications running within a single execution environment (e.g., container).

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1A:
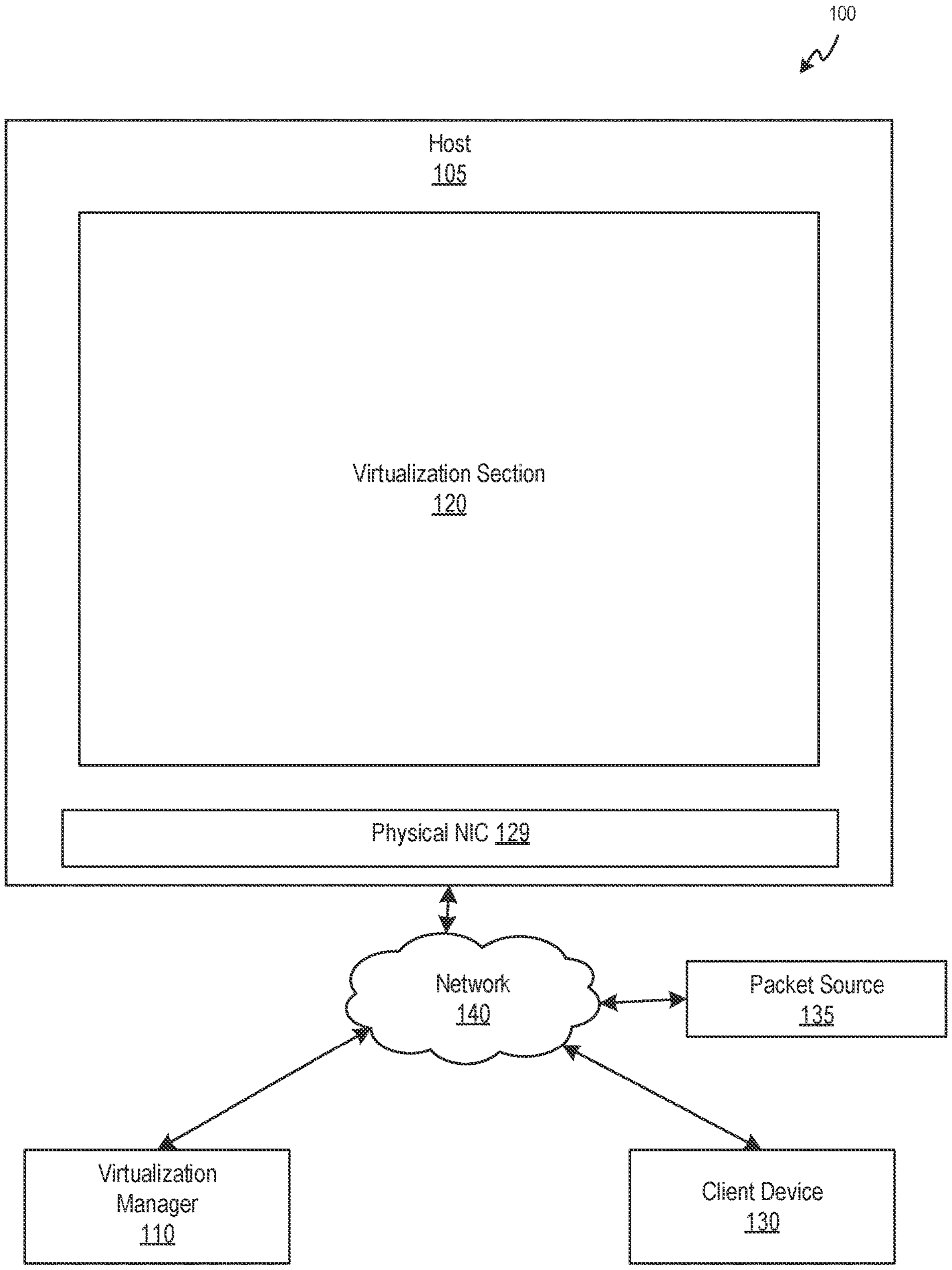
FIGS. 1A-1C depict diagrams of example system architectures operating in accordance with one or more aspects of the present disclosure.

A virtualization system can include one or more hosts that execute one or more virtualized execution environments (e.g., one or more virtual machines and/or one or more containers) to provide various services. However, the hosts that communicate over a network may be vulnerable to various types of network related security issues. For example, a denial of service attack may be a large threat faced by service providers. One or more malicious sources may attempt to flood the hosts, virtualized execution environments, and/or applications running on the virtualized execution environments of the service providers in an attempt to make the services unavailable. In other examples, malicious sources may send malicious packets with unexpected data to the various virtualized execution environments. The unexpected data may include a command instead of a username, for example, and the command may execute to install a virus on the host or extract confidential data.

Certain processor architectures support virtualization by providing special instructions for facilitating containerized application execution. In certain implementations, a containerized application may be an application running in a container in a virtual system environment. A processor may support executing a supervisor that acts as a host and has full control of the processor and other platform hardware. In some cases, a supervisor can be a software module that can monitor and control multiple processes and applications running in containers on a host system. A supervisor is a tool that is able to retain selective control of processor resources, physical memory, interrupt management, and input/output (I/O). Each container is an executable software package that bundles the executable code for one or more applications together with the related configuration files, libraries, and dependencies, and is an isolated execution environment for running the executable code retrieved from the executable software package. The isolated execution environment may be provided by an isolated instance of the user space (i.e., unprivileged execution environment), while sharing the kernel space (i.e., privileged execution environment in which at least part of the operating system kernel runs) with other execution environments (e.g., other containers). Each container can operate independently of other containers and can use the same interface to the processors, memory, storage, graphics, and I/O provided by a physical platform. The software executing in a container can be executed at the reduced privilege level so that the supervisor can retain control of platform resources. When a containerized application needs to perform a privileged operation (e.g., perform an I/O operation), the containerized application may do so by sending a system call to the host OS (e.g., supervisor), requesting that the supervisor perform the privileged operation on behalf of the containerized application. In some cases, the supervisor may be located in one or more containers.

Conventionally, to handle such malicious packets, a virtualized execution environment may process incoming packets and search for patterns that do not match expected usage. If a pattern is found, the incoming packet is used to create a filtering rule and the incoming packet is discarded by the virtualized execution environment. Any subsequent incoming packets received by the virtualized execution environment are then compared to the filtering rule and discarded if the subsequent incoming packets share characteristics with the previous packet determined to be malicious. However, this technique may be inefficient, as the virtualized execution environment may be woken up just to discard incoming packets that match the filtering rule. Further, every virtualized execution environment is executing its filtering rule, which may degrade host performance.

In addition, the incoming packets may be encrypted and just an application on the virtualized execution environment to which the incoming packets are addressed may hold the key to decrypt the packets. Thus, in these instances, a virtualized execution environment may not be able to decrypt the incoming packets to determine whether the incoming packets are malicious.

Accordingly, aspects of the present disclosure generally relate to using logic on a virtualized execution environment to determine whether packets are malicious and using a hypervisor (e.g., if the virtualized execution environment is a VM) or the host OS (e.g., if the virtualized execution environment is a container) to create a filtering rule for the malicious packet to filter subsequent packets that match characteristics of the malicious packet. If a container includes multiple applications, a supervisor executed by the host OS can be used to perform the determination. The virtualized execution environment may add the packets determined to be malicious to a filtering queue. The filtering queue may be located in a network interface card (NIC) of the virtualized execution environment (e.g., a virtual NIC of a virtual machine or a software NIC of a container). Alternatively, the filtering queue may be maintained in memory allocated to a virtual machine or container. In an implementation, the filtering queue may be used solely for malicious packets.

As such, the hypervisor or host OS (e.g., supervisor) may determine that any packet accessed in the filtering queue is malicious and may generate a filtering rule for the malicious packet in view of one or more characteristics of the malicious packet. The characteristics may include a source address of the source of the malicious packet, a snippet of data from the malicious packet, or the like. The filtering rule may specify an action to take, such as block the malicious packet, discard the malicious packet, or the like. The hypervisor or host OS (e.g., supervisor) may store the filtering rules in a data store to apply to determine whether to take action on subsequent packets. Using the hypervisor or host OS (e.g., supervisor) to apply the filtering rules may enhance the performance of the host because resources (e.g., processing, memory) are used more efficiently by removing the filtering logic from the virtualized execution environments and avoiding waking up the virtualized execution environments just to discard packets.

In an implementation, the virtualized execution environment may add metadata to the malicious packet prior to adding the malicious packet to the filtering queue. The metadata may indicate a type of malicious packet. For example, the type may indicate "denial of service," "distributed denial of service," "ping of death," and so forth. A hypervisor or host OS (e.g., supervisor) may add the metadata associated with the malicious packet to the filtering rule created for that malicious packet. If the filtering rule is applied to take action on a subsequent packet, the hypervisor or host OS (e.g., supervisor) may log the action (e.g., discard) taken and the metadata (e.g., type of malicious packet) in an event log. In another implementation, the virtualized execution environment may add metadata to a packet to indicate that the packet is no longer malicious. In such an instance, the virtualized execution environment may cause the hypervisor or host OS (e.g., supervisor) to disable (e.g., remove, suspend) a filtering rule associated with the packet indicated as no longer being malicious (e.g., send a signal to the hypervisor to disable the filtering rule).

In another implementation, the information obtained from one virtualized execution environment may be used to protect other virtualized execution environments. For example, a hypervisor or host OS (e.g., supervisor) may create a filtering rule for a packet determined to be malicious by a first virtualized execution environment and apply the filtering rule to determine whether subsequent packets addressed to the first virtualized execution environment and subsequent packets addressed to a second virtualized execution environment are malicious. In such an instance, the first virtualized execution environment and the second virtualized execution environment may satisfy a trust condition, such as the first virtualized execution environment and the second virtualized execution environment being owned by the same user.

In yet another implementation, several virtualized execution environments may determine that packets sharing the same characteristics are malicious. As such, a hypervisor or host OS (e.g., supervisor) may generate a similar filtering rule in view of the characteristics of the malicious packets accessed in different respective filtering queues of the virtualized execution environments. The hypervisor or host OS (e.g., supervisor) may recognize that the filtering rules are similar and add one of the filtering rules. For example, the filtering rules can be added to a physical NIC (or a NIC driver) of the host. Additionally or alternatively, the hypervisor or host OS (e.g., supervisor) may recognize that the malicious packets accessed in the filtering queues are similar and generate one filtering rule that is installed on the physical NIC. The physical NIC may apply the filtering rule to any subsequent packets that are determined to match one or more characteristics of the malicious packets. Using the physical NIC to apply the filtering rule may further enhance performance because neither the hypervisor/supervisor nor the virtualized execution environments may be involved in filtering subsequent packets. In instances where the physical NIC does not support filtering, the hypervisor or host OS (e.g., supervisor) may install one of the filtering rules for incoming packets addressed to several of the virtualized execution environments, even if the virtualized execution environments do not satisfy a trust condition.

In an alternative implementation, instead of filtering incoming packets in hardware using the physical NIC, filtering can be performed in software. For example, the filtering can be performed using eXpress data path (XDP). It may be beneficial to perform the filtering in software, even if the physical NIC supports filtering. Moreover, filtering can be performed in software in situations in which the physical NIC is not accessible (e.g., when running in a nested virtualization environment). In yet another implementation, the hypervisor or host OS (e.g., supervisor) may disable the filtering rule at a desired point in time. For example, after a predefined time period, the hypervisor or host OS (e.g., supervisor) may disable (e.g., remove, temporarily suspend) a particular filtering rule to allow subsequent packets having characteristics specified in the disabled filtering rule to be sent to a virtualized execution environment. This may enable the virtualized execution environment to make another determination of whether the packet is malicious. In an example, the virtualized execution environment may send a signal to the hypervisor or host OS (e.g., supervisor) that the packet is no longer malicious. In another example, the virtualized execution environment may not notify the hypervisor or host OS (e.g., supervisor) that the packet is no longer malicious. In yet another example, if the virtualized execution environment determines that the packet is malicious again, the virtualized execution environment may add the packet to the filtering queue for filtering by the hypervisor or host OS (e.g., supervisor).

FIG. 1A illustrates an example system architecture 100 in which implementations of the disclosure may operate. The system architecture 100 may include at least one host system ("host") 105, a virtualization manager 110, a virtualization section 120, a client device 130, and at least one packet source 135 coupled via a network 140. Although one host 105 is shown, it should be understood that any suitable number of hosts may be included in the system architecture 100 and the other hosts may include similar components and features as the host 105. The network 140 may be a public network (e.g., the Internet), a private network (e.g., a local area network (LAN) or wide area network (WAN)), or a combination thereof. Network 140 may include a wireless infrastructure, which may be provided by one or more wireless communications systems, such as a wireless fidelity (WiFi) hotspot connected with the network 140 and/or a wireless carrier system that can be implemented using various data processing equipment, communication towers, etc. Additionally or alternatively, network 140 may include a wired infrastructure (e.g., Ethernet).

The host 105 may comprise one or more processors communicatively coupled to memory devices and input/output (I/O) devices. The host 105 may run one or more virtualized execution environments of the virtualization section 120. In some implementations, the virtualization section 120 includes one or more virtual machines (VMs). The host 105 can run a hypervisor to manage the virtual machines. Further details regarding the one or more virtual machines are described below with reference to FIG. 1B.

In some implementations, the virtualization section 120 includes one or more containers. Each container may include a number of applications. Each container can execute a supervisor that is used to manage a number of processes executed by the container. A supervisor is a tool that allows for monitoring and control of a number of processes and/or applications. For example, a supervisor can be used to run and/or manage (e.g., coordinate) multiple processes within a container (e.g., a main process and one or more child processes). Further details regarding the one or more containers are described below with reference to FIG. 1C.

The packet source 135 may be another host in the same cluster as the host 105 or a different cluster within a datacenter. Additionally or alternatively, the packet source 135 may be any suitable networking device capable of sending packets. The packet source 135 may include numerous networking devices. For example, the packet source 135 may be one or more servers, switches, relays, routers, bridges, or the like. The packet source 135 may be external to the datacenter in which the host 105 is located. In an implementation, the packet source 135 may send packets addressed to each virtualized execution environment of the virtualization section 120. In another implementation, the packets may be addressed to a particular endpoint (e.g., application) on a virtualized execution environment. The host 105 may include at least one physical network interface cards (NIC) 129 that receives the packets from the packet source 135 via the network 140. The virtualization section 120 may be communicatively connected to the physical NIC 129 via a bridge of the host 105. The physical NIC 129 may transmit the packets to their destination within the virtualization section 120 (e.g., virtual machine, container, application, etc.). In one implementation, the packets may originate and be sent from a device or application internal to the host 105.

In some instances, the packets sent from the packet source 135 may be malicious packets attempting to cause some undesirable effect on the host 105 and/or the virtualization section 120 (e.g., virtualized execution environments). As described in detail below, aspects of the present disclosure relate to detecting these malicious packets on the virtualized execution environments and filtering (e.g., blocking, discarding) the malicious packets in a performance improving and efficient manner (e.g., using the hypervisor or host OS (e.g., supervisor)).

The virtualization manager 110 may be hosted by a computer system and include one or more computer programs executed by the computer system for centralized management of the system architecture 100. In one implementation, the virtualization manager 110 may comprise various interfaces, including administrative interface, reporting interface, and/or application programming interface (API) to communicate with the client device 130 (e.g., laptop, desktop, tablet, smartphone, server), the host 120 of system architecture 100, as well as to user portals, directory servers, and various other components, which are omitted from FIG. 1A for clarity. An administrator may use the client device 130 to view the event log to determine what filtering actions have been performed by the hypervisor 122 and what type of malicious packets have been detected and filtered (e.g., blocked, discarded). The event log may aid in troubleshooting and/or debugging if issues arise on the host 120.

Figure 1B:
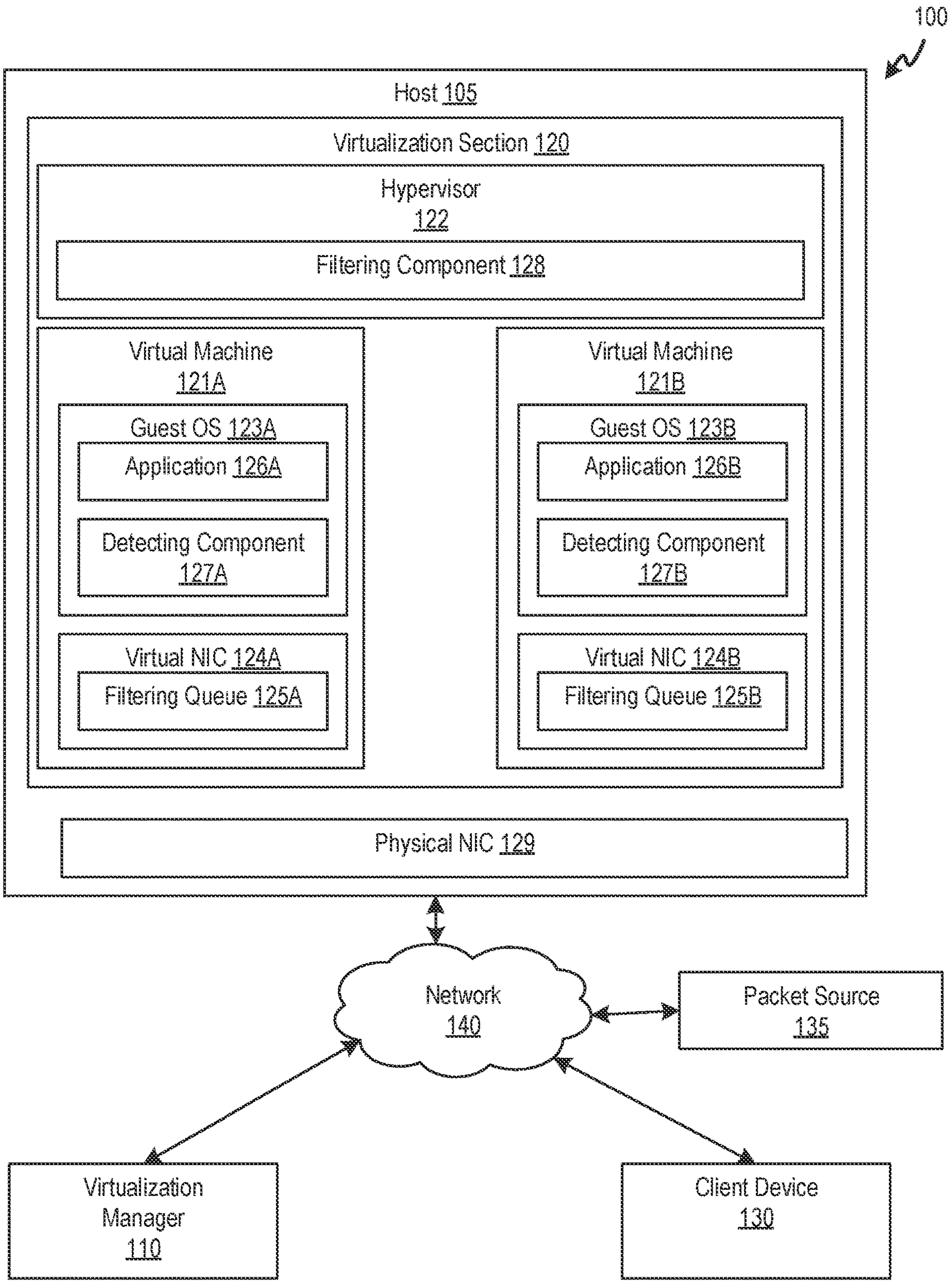

FIG. 1B depicts a block diagram of an example system architecture 100 operating in accordance with one or more aspects of the present disclosure. In this illustrative example, the host 105 may run a virtualization section 120 including a plurality of virtual machines 121A and 121B by executing a hypervisor 122, respectively, to abstract the physical layer, including processors, memory, and I/O devices, and present this abstraction to the virtual machines 121A and 121B as virtual devices. The hypervisor 122 may be a product of Red Hat® and may include Red Hat® Virtualization (RHV), which is a product based on a kernel-based virtual machine (KVM) hypervisor. Additionally or alternatively, the hypervisor 122 may be a vSphere hypervisor of VMware®, a Hyper-V hypervisor of Microsoft®, or a hypervisor included in Oracle® VM VirtualBox.

The hypervisor 122 may create, run, manage, and monitor various aspects of virtual machines operation, including the processing, and storage, memory, and network interfaces. For example, as depicted, the hypervisor 122 may run virtual machines 121A and 121B. The virtual machines 121A and 121B may each execute a guest operating system 123A and 123B that may utilize the underlying virtual devices, including virtual processors, virtual memory, virtual network interface cards (NICs) 124A and 124B, and virtual I/O devices. According to an implementation, each virtual NIC 124A and 124B includes a filtering queue 125A and 125B designated for packets determined to be malicious by the virtual machines 121A and 121B, respectively. The filtering queues 125A and 125B may provide a special interface with the hypervisor 122 whereby the hypervisor 122 understands that any packet placed in the filtering queues 125A and 125B are malicious packets.

In an alternative implementation, instead of maintaining the filtering queues 125A and 125B in respective ones of the virtual NICs 124A and 124B, each of the filtering queues 125A and 125 B is maintained in memory allocated for a respective one of the virtual machines 121A and 121B. For example, the hypervisor 122 can allocate respective memory for each of the virtual machines 121A and 121B, and maintain the filtering queues 125A and 125B in respective ones of the allocated memories. Packets can be added to the filtering queues 125A and 125B by, for example, exposing the respective virtual machines 121A and 121B to an API.

The hypervisor 122 may be communicatively connected to the physical NIC 129 via a bridge of the host 105. The physical NIC 129 may transmit the packets to the hypervisor 122 and the hypervisor 122 may forward the packets to their destination (e.g., virtual machine 121A or 121B, application 126A or 126B, etc.). In one implementation, the packets may originate and be sent from a device or application internal to the host 105.

As described above with reference to FIG. 1A, the packet source 135 may be another host in the same cluster as the host 105 or a different cluster within a datacenter. Additionally or alternatively, the packet source 135 may be any suitable networking device capable of sending packets. The packet source 135 may include numerous networking devices. For example, the packet source 135 may be one or more servers, switches, relays, routers, bridges, or the like. The packet source 135 may be external to the datacenter in which the host 105 is located. In an implementation, the packet source 135 may send packets addressed to the virtual machine 121A or 121B. In another implementation, the packets may be addressed to a particular endpoint (e.g., application 126A or 126B) on the virtual machine 121A or 121B. The host 105 may include one or more physical network interface cards (NICs) 129 that receive the packets from the packet source 135 via the network 140. The hypervisor 122 may be communicatively connected to the physical NIC 129 via a bridge of the host 105. The physical NIC 129 may transmit the packets to the hypervisor 122 and the hypervisor 122 may forward the packets to their destination (e.g., virtual machine 121A or 121B, application 126A or 126B, etc.). In one implementation, the packets may originate and be sent from a device or application internal to the host 105.

In some instances, the packets sent from the packet source 135 may be malicious packets attempting to cause some undesirable effect on the applications 126A or 126B, the guest operating systems 123A or 123B, the virtual machines 121A or 121B, the hypervisor 122, and/or the host 105. As described in detail below, aspects of the present disclosure relate to detecting these malicious packets on the virtual machines 121B and 121B and filtering (e.g., blocking, discarding) the malicious packets using the hypervisor 122 in a performance improving and efficient manner.

The applications 126A and 126B may be running on each of the virtual machines 121A and 121B under the guest operating systems 123A and 123B. The applications 126A and 126B may include system level applications or high level applications (e.g., productivity applications (word processing, presentation, spreadsheet, email, calendar, etc.), browsers, etc.). The guest operating systems 123A and 123B may include a detecting component 127A and 127B. Although shown as a component of the guest operating system 123A and 123B, the detecting components 127A and 127B may be included as part of the applications 126A and 126B, respectively. The detecting components 127A and 127B may include logic implemented as computer instructions stored in one or more memories and executed by one or more processing devices of the host 105.

The detecting components 127A and 127B may include logic for determining when packets are malicious. For example, the logic may search the packets for patterns of unexpected data usage (e.g., including a command where a data field is expected) and determine that packets including the unexpected data usage are malicious. If a packet is determined to be malicious, the detecting components 127A and 127B may add the malicious packet to the appropriate filtering queue 125A and 125B. In an implementation, a counter (e.g., 8 bit) may be used to accumulate a sample of malicious packets on the local storage of the virtual machines 121A and 121B prior to adding the sample of malicious packets to the filtering queues 125A and 125B. This technique may regulate the flow of malicious packets to the hypervisor 122.

Further, in some instances, prior to adding the malicious packets to the filtering queues 125A and 125B, the detecting components 127A and 127B may add metadata to the malicious packets. The metadata may indicate a type of malicious packet. For example, the type may indicate "denial of service," "distributed denial of service," "ping of death," and so forth. The metadata may include the source address of the packet source 135 from where the packets originated and a type of malicious packet, among other things. In another example, as explained further below, the detecting components 127A and 127B may add metadata to a packet that is determined to no longer be malicious and may send a signal including the packet and the metadata to the hypervisor 122 to enable the hypervisor 122 to disable any filtering rules associated with the packet or update the filtering rules. The hypervisor 122 may add the metadata associated with the malicious packet to the filtering rule created for that malicious packet. If the filtering rule is applied to take action on a subsequent packet, the supervisor may log the action (e.g., discard) taken and the metadata (e.g., type of malicious packet) in an event log. In another implementation, metadata can be added to a packet to indicate that the packet is no longer malicious. In such an instance, the hypervisor 122 may disable (e.g., remove, suspend) a filtering rule associated with the packet indicated as no longer being malicious.

The hypervisor 122 may include a filtering component 128. The filtering component 128 may include logic implemented as computer instructions stored in one or more memories and executed by one or more processing devices of the host 105. The filtering component 128 may access the filtering queues 125A and 125B to retrieve the packets determined to be malicious by the virtual machines 121A and 121B. Further, the filtering component 128 may generate a filtering rule for each of the packets in view of one or more characteristics of the packets. Further, the filtering component 128 may add the metadata provided with the malicious packet by the virtual machine 121A or 121B to the generated filtering rules. The filtering rules may be stored in a data store.

The filtering rules may be applied to subsequent packets addressed to the virtual machine 121A or 121B to determine whether to discard the subsequent packets when they match one or more characteristics of the packet determined to be malicious. The filtering component 128 may use various techniques, such as machine learning, when determining whether the characteristics match the filtering rules. A model may be generated using the packets determined to be malicious by the virtual machine 121A or 121B and the model may be used to predict when subsequent packets match characteristics of the malicious packet. The filtering component 128 may log the filtering action performed by applying the filtering rules and the metadata associated with the filtering rules applied in an event log. Such logging may aid debugging or troubleshooting by the hypervisor 122 or an administrator.

In an implementation, the filtering component 128 may apply a filtering rule generated for the virtual machine 121A to determine whether to discard packets addressed to another virtual machine (e.g., virtual machine 121B). That is, the filtering rule may be applied to determine whether subsequent packets addressed to the virtual machine 121A and whether subsequent packets addressed to the virtual machine 121B match characteristics of the packet determined to be malicious by the virtual machine 121A. In this way, information about malicious packets detected by one virtual machine may be used to protect the other virtual machines running via the hypervisor 122.

In another implementation, the detecting components 127A and 127B may separately determine that packets sharing the same characteristics are malicious. As such, the VM detecting components 127A and 127B may add the packets to the respective filtering queue 125A and 125B. The hypervisor 122 may access the filtering queues 125A and 125B to retrieve the packets and generate a similar filtering rule in view of the characteristics of the malicious packets. The hypervisor 122 may determine that the filtering rules are similar and install one of the filtering rules to the physical NIC 129. Additionally or alternatively, the hypervisor 122 may determine that the malicious packets accessed in the filtering queues 125A and 125B are similar and generate one filtering rule that is installed on the physical NIC 129. In instances where the physical NIC 129 does not support filtering, the hypervisor 122 may execute one of the filtering rules for incoming packets for the virtual machines 121A and 121B. In an example, the hypervisor 122 may execute the filtering rule for incoming packets of the virtual machines 121A and 121B when the virtual machines 121A and 121B satisfy a trust condition or when the virtual machines 121A and 121B do not satisfy a trust condition.

In an alternative implementation, instead of filtering incoming packets in hardware using the physical NIC 129, filtering can be performed in software (e.g., XDP). It may be beneficial to perform the filtering in software, even if the physical NIC 129 supports filtering. Moreover, filtering can be performed in software in situations in which the physical NIC 129 is not accessible (e.g., when running in a nested virtualization environment).

In yet another implementation, the hypervisor 122 may disable (e.g., remove, temporarily suspend) a filtering rule after a predefined period of time. For example, the hypervisor 122 may disable a particular filtering rule to allow subsequent packets having characteristics specified in the disabled filtering rule to be sent to a virtual machine 121A or 121B to facilitate determination of whether the packet is malicious.

In yet another implementation, the hypervisor 122 may communicate with the virtualization manager 110 (described above with reference to FIG. 1A) using a Virtual Desktop and Server Management (VDSM) daemon (not shown). The VDSM daemon may include an application programming interface (API) with which the virtualization manager 110 interfaces. The VDSM or any suitable application executing on of the host 105 may provide status notifications to the virtualization manager 110 that indicate the operating state of the hypervisor 122 and/or the virtual machines 121A and 121B. The status notification may be transmitted by the VDSM or other application when the hypervisor 122 generates a filtering rule. The virtualization manager 110 may notify another hypervisor executing on another host in the virtualization environment of the filtering rule generated by the hypervisor 122. This may enable other hypervisors to apply the filtering rule to filter subsequent packets addressed to virtual machines on other hosts, as well. Likewise, the other hosts may install the filtering rules on their physical NICs, if desired.

Figure 1C:
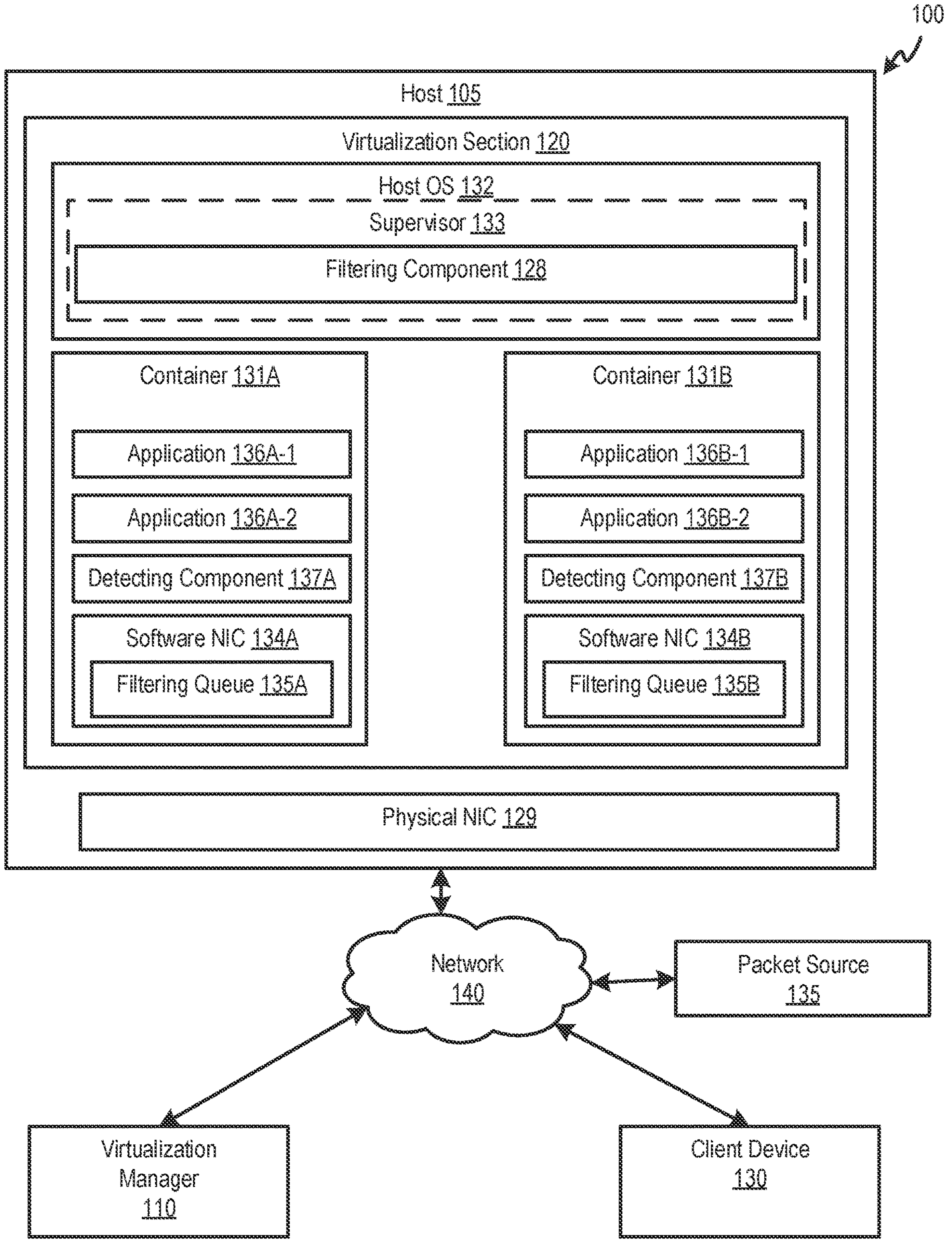

FIG. 1C depicts a block diagram example system architecture 100 operating in accordance with one or more aspects of the present disclosure. In this illustrative example, the host 105 may run a virtualization section 120 including a plurality of containers 131A and container 131B. In some implementations, the virtualization section 120 includes a single container.

Each of the containers 131A and 131B can include a set of applications. In this illustrative example, the container 131A includes applications 136A-1 and 136A-2, and the container 131B includes applications 136B-1 and 13B-2. However, each of the containers 131A and 131B can execute any suitable number of applications. The applications 136A and 136B may be similar to the applications 126A and 126B described above with reference to FIG. 1B.

As further shown, the virtualization section 120 can include a host OS 132. The host OS 132 can manage the container 131A and/or the container 131B. For example, in some implementations, the host OS 132 can include a supervisor 133 that manages execution of the applications 136A-1 and 136A-2 and/or the applications 136B-1 and 136B-2. In this illustrative example, the supervisor 133 is shown as being executed by the host OS 132. In some implementations, the supervisor 133 can be executed within at least one of the container 131A or the container 131B. In some implementations, the virtualization section 120 does not include a supervisor.

The container 131A can include a software network interface card (NIC) 134A and the container 131B can include a software NIC 134B. According to an implementation, the software NIC 134A and the software NIC 134B each include a filtering queue 135A and a filtering queue 135B, respectively, designated for packets determined to be malicious by the containers 131A and/or 131B. Similar to the filtering queues 125A and 125B described above with reference to FIG. 1B, any packets placed in the filtering queues 135A and/or 135B are malicious packets.

In an alternative implementation, instead of maintaining the filtering queues 135A and 135B in respective ones of the software NICs 134A and 134B, each of the filtering queues 135A and 135B is maintained in memory allocated for a respective one of the containers 131A and 131B. For example, the supervisor 132 can allocate respective memory for each of the containers 131A and 131B, and maintain the filtering queues 135A and 135B in respective ones of the allocated memories. Packets can be added to the filtering queues 135A and 135B by, for example, exposing the respective containers 131A and 131B to an API.

The containers 131A and 131B may each include a respective detecting component 127A and 127B. The VM detecting components 137A and 137B may be included as part of the applications 126A and 126B, respectively. If at least one of the containers 131A or 131B is a virtual machine, then at least one of the detecting components 137A or 137B can run on a guest operating system. The detecting components 137A and 127B may include logic implemented as computer instructions stored in one or more memories and executed by one or more processing devices of the host 105.

Similar to the detecting components 127A and 127B of FIG. 1B, the detecting components 137A and 137B may include logic for determining when packets are malicious, and adding the malicious packet to the appropriate filtering queue 135A and 135B.

Further, in some instances, prior to adding the malicious packets to the filtering queues 135A and 125B, the detecting components 137A and 137B may add metadata to the malicious packets. The metadata may indicate a type of malicious packet. For example, the type may indicate "denial of service," "distributed denial of service," "ping of death," and so forth. The metadata may include the source address of the packet source 135 from where the packets originated and a type of malicious packet, among other things. In another example, the detecting components 137A and 137B may add metadata to a packet that is determined to no longer be malicious and may send a signal including the packet and the metadata to the host OS 132, respectively, to enable the host OS 132 to disable any filtering rules associated with the packet or update the filtering rules.

The host OS 132 may include a filtering component 138. For example, in embodiments in which the virtualization section includes the supervisor 133, the filtering component can be in the supervisor 133. The filtering component 138 may include logic implemented as computer instructions stored in one or more memories and executed by one or more processing devices of the host 105. The filtering component 138 may access the filtering queues 135A and 135B to retrieve the packets determined to be malicious by the containers 131A and 131B. Further, the filtering component 138 may generate a filtering rule for each of the packets in view of one or more characteristics of the packets. Further, the filtering component 138 may add the metadata provided with the malicious packet by the containers 131A and 131B to the generated filtering rules. The filtering rules may be stored in a data store.

The host OS 132 (e.g., the supervisor 133) may interface with the filtering queues 135A and 135B, respectively, to determine that any packet accessed in the filtering queues 135A and/or 135B is malicious. For example, the host OS 132 (e.g., the supervisor 133) may generate filtering rules for the malicious packet in view of one or more characteristics of the malicious packet. The characteristics may include a source address of the source of the malicious packet, a snippet of data from the malicious packet, or the like. The filtering rule may specify an action to take, such as block the malicious packet, discard the malicious packet, or the like. The host OS 132 (e.g., the supervisor 133) may store the filtering rule in a data store. The filter rule can be used to determine whether to take action on subsequent packets.

The filtering rules may be applied to subsequent packets addressed to the containers 131A and/or 131B to determine whether to discard the subsequent packets when they match one or more characteristics of the packet determined to be malicious. The filtering component 138 may use various techniques, such as machine learning, when determining whether the characteristics match the filtering rules. A model may be generated using the packets determined to be malicious by the containers 131A and 131B and the model may be used to predict when subsequent packets match characteristics of the malicious packet. The filtering component 138 may log the filtering action performed by applying the filtering rules and the metadata associated with the filtering rules applied in an event log. Such logging may aid debugging or troubleshooting by the host OS 132 (e.g., the supervisor 133) or an administrator.

In an implementation, the filtering component 138 may apply a filtering rule generated for the container 131A to determine whether to discard packets addressed to another virtualized execution environment (e.g., the container 131B). In another implementation, the filtering component 138 may apply a filtering rule generated for the container

131B to determine whether to discard packets addressed to another virtualized execution environment (e.g., the container 131A). That is, the filtering rule may be applied to determine whether subsequent packets addressed to the containers 131A and 131B match characteristics of the packets determined to be malicious by the containers 131A and container 131B. In this way, information about malicious packets detected by one virtualized execution environment may be used to protect the other virtualized execution environments.

In another implementation, the detecting components 137A and 137B may separately determine that packets sharing the same characteristics are malicious. As such, the detecting components 137A and 137B may add the packets to the respective filtering queues 135A and 135B. The host OS 132 may access the filtering queues 135A and 135B to retrieve the packets and generate a similar filtering rule in view of the characteristics of the malicious packets. The host OS 132 may determine that the filtering rules are similar and install one of the filtering rules to the physical NIC 129. Additionally or alternatively, the host OS 132 (e.g., the supervisor 133) may determine that the malicious packets accessed in the filtering queues 135A and 135B are similar and generate one filtering rule that is installed on the physical NIC 129. In instances where the physical NIC 129 does not support filtering, the host OS 132 (e.g., the supervisor 133) may execute one of the filtering rules for incoming packets for the containers 131A and 131B. In an example, the host OS 132 (e.g., the supervisor 133) may execute the filtering rule for incoming packets of respective ones of the containers 131A and 131B when the containers 131A or 131B satisfy a trust condition or when the containers 131A or 131B do not satisfy a trust condition.

In an alternative implementation, instead of filtering incoming packets in hardware using the physical NIC 129, filtering can be performed in software (e.g., XDP). It may be beneficial to perform the filtering in software, even if the physical NIC 129 supports filtering. Moreover, filtering can be performed in software in situations in which the physical NIC 129 is not accessible (e.g., when running in a nested virtualization environment).

In yet another implementation, the host OS 132 (e.g., the supervisor 133) may disable (e.g., remove, temporarily suspend) a filtering rule after a predefined period of time. For example, the host OS 132 (e.g., the supervisor 133) may disable a particular filtering rule to allow subsequent packets having characteristics specified in the disabled filtering rule to be sent to containers 131A and 131B to facilitate determination of whether the packet is malicious.

In yet another implementation, the host OS 132 (e.g., the supervisor 133) may communicate with the virtualization manager 110 (described above with reference to FIG. 1A) using a Virtual Desktop and Server Management (VDSM) daemon (not shown). The VDSM daemon may include an application programming interface (API) with which the virtualization manager 110 interfaces. The VDSM or any suitable application executing on of the host 105 may provide status notifications to the virtualization manager 110 that indicate the operating state of the containers 131A and 131B. The status notification may be transmitted by the VDSM or other application when the host OS 132 (e.g., the supervisor 133) generates a filtering rule. The virtualization manager 110 may notify another virtualization section (e.g., hypervisor or host OS (e.g., supervisor)) executing on another host in the virtualization environment of the filtering rule generated by the host OS 132. This may enable other virtualized execution environments to apply the filtering rule to filter subsequent packets on other hosts, as well. Likewise, the other hosts may install the filtering rules on their physical NICs, if desired.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Figure 2:
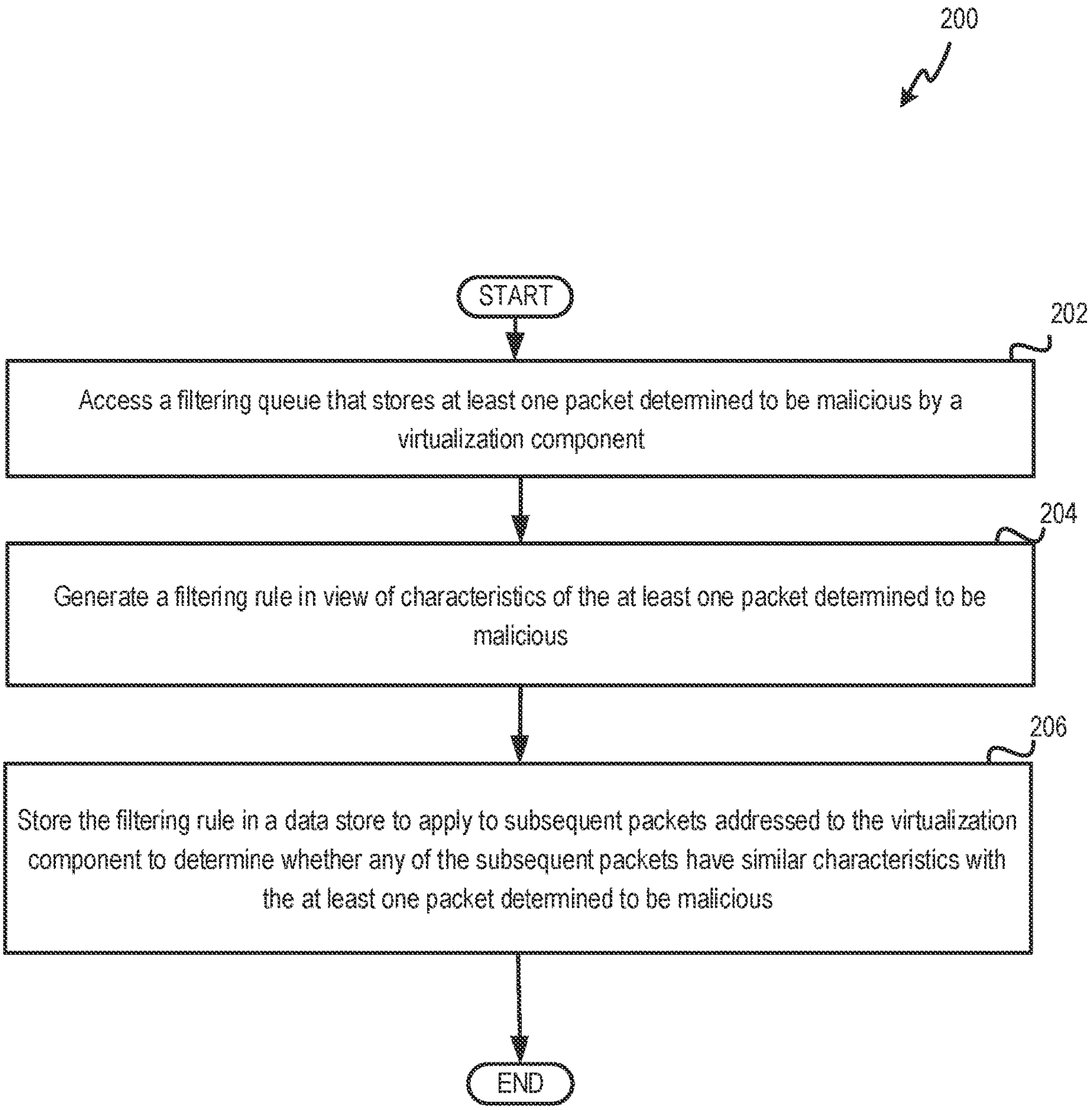
FIG. 2 depicts a flow diagram of an example method for generating a filtering rule in view of a packet determined to be malicious by a virtualized execution environment, in accordance with one or more aspects of the present disclosure.

FIG. 2 depicts a flow diagram of an example method for generating a filtering rule in view of a packet determined to be malicious by a virtualized execution environment, in accordance with one or more aspects of the present disclosure. Method 200 and each of its individual functions, routines, subroutines, or operations may be performed by one or more processing devices of the computer device executing the method 200. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processes implementing method 200 may be executed asynchronously with respect to each other. In one implementation, method 200 may be performed by a filtering component of a hypervisor. In another implementation, method 200 may be performed by a filtering component of a host OS (e.g., supervisor).

Method 200 may begin at block 202. At block 202, a processing device may access a filtering queue that stores at least one packet determined to be malicious by a first virtualized execution environment. In an implementation, the first virtualized execution environment is a virtual machine run by a hypervisor (e.g., the virtual machine 121A), and the filtering queue may be located in a virtual NIC of the virtual machine (e.g., virtual NIC 124A). In another implementation, the first virtualized execution environment is a container including a number of applications (e.g., the container 131A), and the filtering queue may be located in a software NIC of the container (e.g., software NIC 134A).

Further, in an implementation, the filtering queue may be designated solely for packets that are determined to be malicious by a detecting component (e.g., the VM detecting component 127A or the container detecting component 127B). In an example, the detecting component may flag packets as being malicious after recognizing a pattern of unexpected data usage and may add the malicious packets to the filtering queue. In an implementation, the detecting component may add metadata to the packet prior to adding the packet to the filtering queue. The metadata may provide a status indication (e.g., that the packet is malicious), a type of malicious packet that is detected, a source address of the packet source from which the malicious packet was sent, and the like.

At block 204, the processing device may generate a filtering rule in view of characteristics of the at least one packet determined to be malicious. Further, in instances where metadata is added to the malicious packet prior to adding the malicious packet to the filtering queue, the processing device may identify the metadata added to the packet and add the metadata to the filtering rule associated with the packet.

In an implementation, the processing device may also access a second filtering queue of a second virtualized execution environment (e.g., a virtualization machine or container). The second filtering queue may store at least a second packet determined to be malicious by the second virtualized execution environment. The processing device may generate a second filtering rule in view of characteristics of the second packet determined to be malicious. In response to determining that the filtering rule and the second filtering rule are similar or the packet and the second packet share similar characteristics, the processing device may install the filtering rule in the physical NIC to apply to packets at the physical NIC to determine whether any of the packets have similar characteristics with the packet and the second packet determined to be malicious.

At block 206, the processing device may store the filtering rule in a data store to apply to subsequent packets addressed to the first virtualized execution environment to determine whether any of the subsequent packets have similar characteristics with the at least one packet determined to be malicious. For example, the processing device may receive a subsequent packet addressed to the first virtualized execution environment from the physical NIC. In response to determining that the subsequent packet has similar characteristics with the packet determine to be malicious, the filtering rule may be applied to filter (e.g., block, discard) the subsequent packet, thereby preventing the subsequent packet from being sent to the first virtualized execution environment. In an implementation, the processing device may log, in an event log, the filtering action (e.g., discarding) performed on the subsequent packet by applying the rule along with the metadata included in the filtering rule. As may be appreciated, if the first virtualized execution environment is sleeping, not sending the subsequent packet to the first virtualized execution environment may enable the first virtualized execution environment to remain asleep and reduce resource usage of the host.

In an implementation, the processing device may apply the filtering rule to packets addressed to a second virtualized execution environment (e.g., a virtual machine or a container) that satisfies a trust condition with the first virtualized execution environment. The trust condition may verify whether the first and second virtualized execution environments belong to a same user, for example.

In another implementation, the processing device may disable the filtering rule after a predefined period of time. For example, the processing device may remove the filtering rule after the predefined period of time and transmit subsequent packets to the first virtualized execution environment to facilitate determination of whether the subsequent packets are malicious. In another example, the processing device may temporarily suspend the filtering rule for a set period of time (e.g., seconds, minutes, hours) and send subsequent packets to the first virtualized execution environment to facilitate determination of whether the subsequent packets are malicious while the filtering rule is temporarily suspended.

In another implementation, the processing device may receive a signal from the first virtualized execution environment. The signal may include a packet that was previously determined to be malicious by the first virtualized execution environment and metadata included with the packet. The metadata may provide an indication that the packet is no longer flagged as malicious by the first virtualized execution environment. For example, in some instances, the first virtualized execution environment may install an update to an application. The update may eliminate the malicious activity that may be caused by the packet. Thus, the first virtualized execution environment may notify the supervisor that the packets are no longer flagged as malicious. The processing device of the supervisor may disable a filtering rule associated with the packet. Further, the processing device may use the data related to the packet no longer being malicious to update any models used to predict whether subsequent packets are malicious.

Figure 3A:
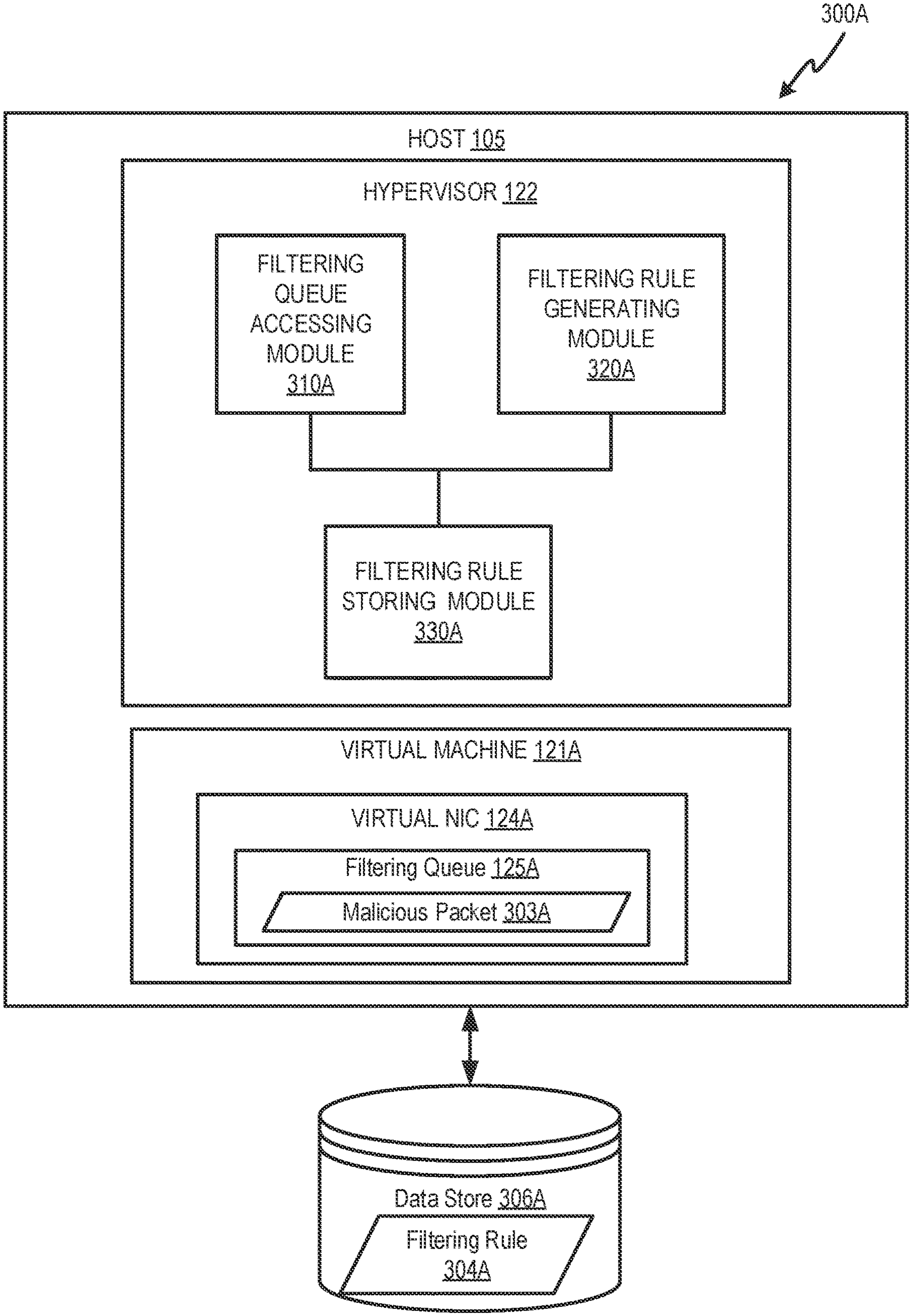
FIG. 3A depicts a block diagram of an example computer system including a virtual machine for performing the method of FIG. 2, in accordance with one or more aspects of the present disclosure.

FIG. 3A depicts a block diagram of an example computer system 300A for performing the method of FIG. 2, in accordance with one or more aspects of the present disclosure. In this illustrative example, the computer system 300A includes the host 105, hypervisor 122, virtual machine 121A, and a data store 306A communicatively coupled to the host 105. As shown, the hypervisor 122 includes a filtering queue accessing module 310A, filtering rule generating module 320A, and filtering rule storing module 330A.

The filtering queue accessing module 310A may access the filtering queue 125A that stores at least one packet 303A determined to be malicious by the virtual machine 121A. The filtering queue 125A may be located in the virtual NIC 124A of the virtual machine 121A. Prior to adding the malicious packet 303A to the filtering queue 125A, the detecting component 127A (described above with reference to FIG. 1B) may add metadata to the malicious packet 303A that indicates at least a type of the malicious packet 303A. The detecting component 127A may add the malicious packet 303A including the metadata to the filtering queue 125A for filtering by the hypervisor 122.

The filtering rule generating module 320A may generate at least one filtering rule 304A in view of characteristics of the at least one packet 303A determined to be malicious. Further, in instances where the virtual machine 121A added metadata to the malicious packet 303A prior to adding the malicious packet 303A to the filtering queue 125A, the filtering rule generating module 320A may identify the metadata added to the malicious packet 303A and add the metadata to the filtering rule 304.

The filtering rule storing module 330A may store the filtering rule 304A in the data store 306A to apply to subsequent packets addressed to the virtual machine 121A to determine whether any of the subsequent packets have similar characteristics with the malicious packet 303A. In instances where subsequent packets have similar characteristics (e.g., have the same source address) with the malicious packet 303A, the filtering rule 304 may be applied to discard those subsequent packets.

Figure 3B:
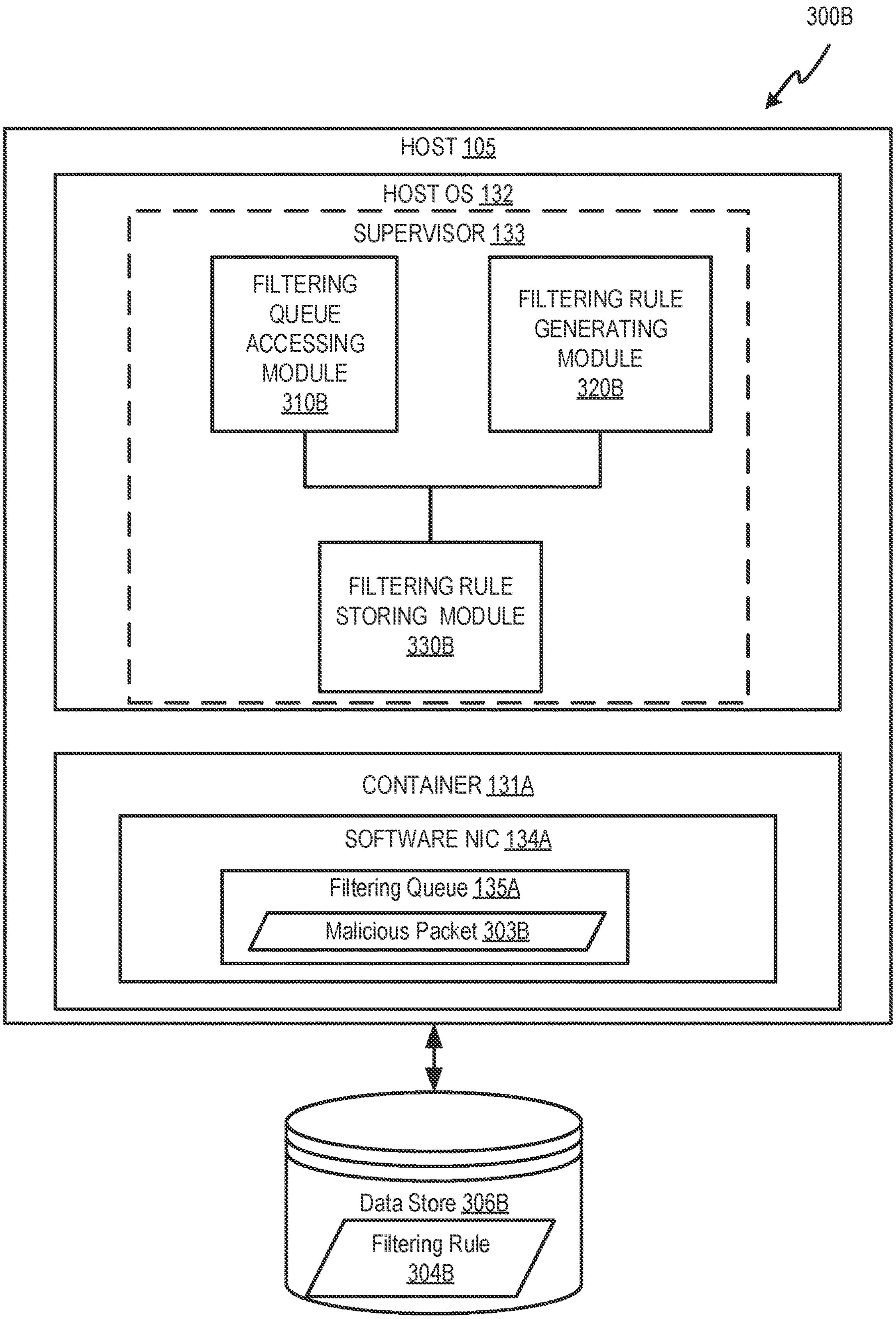
FIG. 3B depicts a block diagram of an example computer system including a container for performing the method of FIG. 2, in accordance with one or more aspects of the present disclosure.

FIG. 3B depicts a block diagram of an example computer system 300B for performing the method of FIG. 2, in accordance with one or more aspects of the present disclosure. In this illustrative example, the computer system 300B includes the host 105, the container 131A including the host OS 132 and software NIC 134, and a data store 306B communicatively coupled to the host 105. As shown, the host OS 132 includes a filtering queue accessing module 310B, filtering rule generating module 320B, and filtering rule storing module 330B. In some implementations, and as shown, the host OS 132 includes a supervisor 133, and the supervisor 133 includes the modules 310B-330B. In alternative implementations, the host OS 132 does not include the supervisor 133. In some implementations, the supervisor 133 is included in the container 131A.

The filtering queue accessing module 310B may access the filtering queue 135A that stores at least one packet 303B determined to be malicious by the virtual machine 121A. The filtering queue 135A may be located in the software NIC 134A. Prior to adding the malicious packet 303B to the filtering queue 135A, the detecting component 137A (described above with reference to FIG. 1C) may add metadata to the malicious packet 303B that indicates at least a type of the malicious packet 303B. The detecting component 137A may add the malicious packet 303B including the metadata to the filtering queue 135A for filtering by the host OS 132.

The filtering rule generating module 320B may generate at least one filtering rule 304B in view of characteristics of the malicious packet 303B. Further, in instances where the virtual machine 121A added metadata to the malicious packet 303A prior to adding the malicious packet 303A to the filtering queue 125A, the filtering rule generating module 320 may identify the metadata added to the malicious packet 303A and add the metadata to the filtering rule associated with the malicious packet 303A.

The filtering rule storing module 330B may store the filtering rule 304B in the data store 306B to apply to subsequent packets addressed to the virtual machine 121A to determine whether any of the subsequent packets have similar characteristics with the malicious packet 303B. In instances where subsequent packets have similar characteristics (e.g., have the same source address) with the malicious packet 303B, the filtering rule 304B may be applied to discard those subsequent packets.

Figure 4:
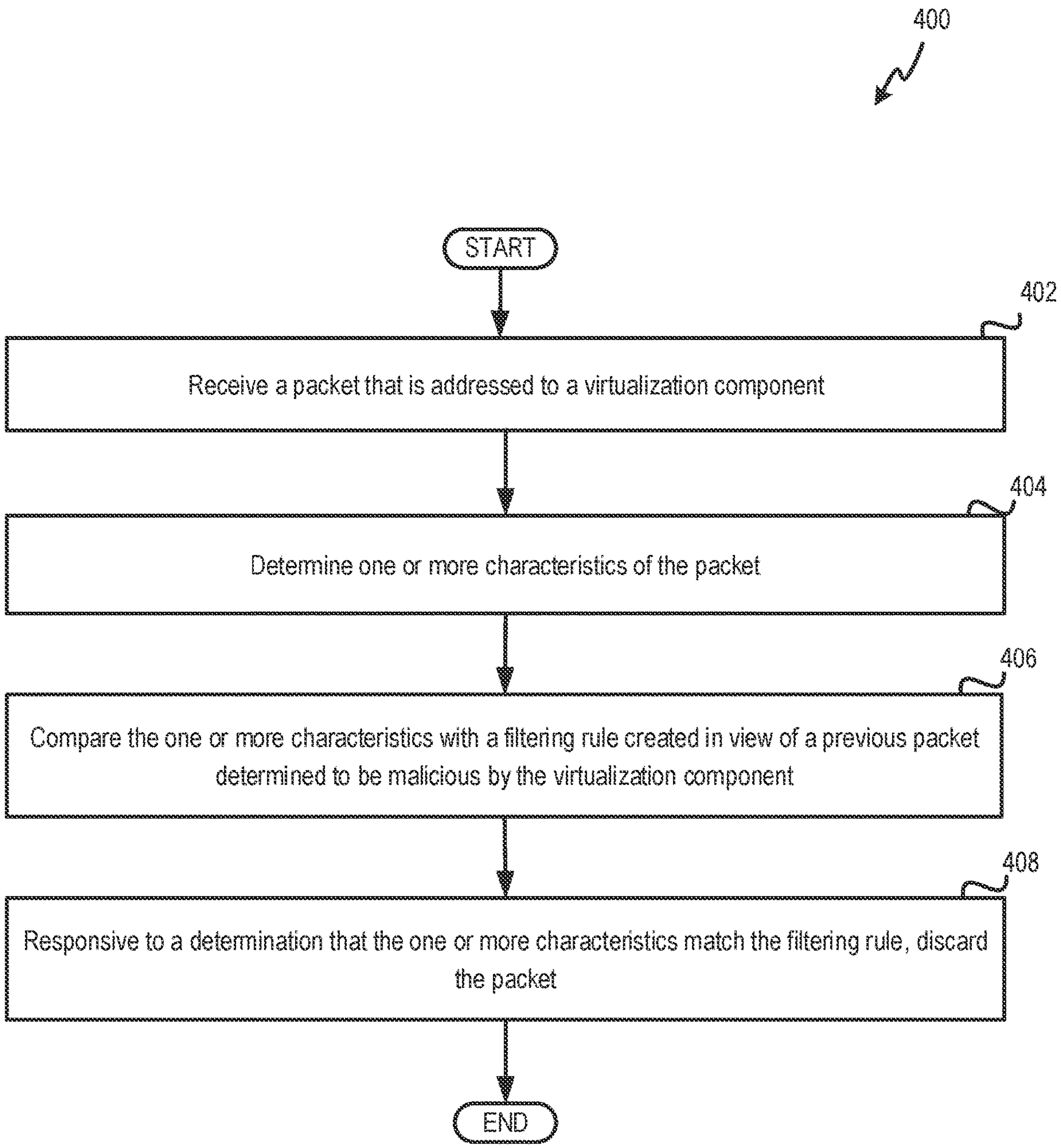
FIG. 4 depicts a flow diagram of an example method for applying a filtering rule to discard packets, in accordance with one or more aspects of the present disclosure.

FIG. 4 depicts a flow diagram of an example method 400 for a supervisor applying a filtering rule to discard packets, in accordance with one or more aspects of the present disclosure. Method 400 includes operations performed by the host (e.g., host 105). Also, method 400 may be performed in the same or a similar manner as described above in regards to method 200. Method 400 may be performed by processing devices of a host executing filtering component of the supervisor.

Method 400 may begin at block 402. At block 402, the processing device may receive a packet that is addressed to a virtualized execution environment. In an implementation, the virtualized execution environment is a virtual machine (e.g., the virtual machine 121A). In another implementation, the virtualized execution environment is a container (e.g., the container 131A). The packet may be sent from a packet source over a network, and the packet may be received by the processing device via a physical NIC that communicates with the network.

At block 404, the processing device may determine one or more characteristics of the packet. For example, the processing device may inspect the packet to identify the source address of the packet, data fields in the packet, data types in the packet, format of the packet, and the like.

At block 406, the processing device may compare the one or more characteristics with a filtering rule create in view of a previous packet determined to be malicious by the virtualized execution environment. The filtering rule may have been created by the processing device in view of the previous packet by accessing a filtering queue of the virtualized execution environment to retrieve the previous packet. The processing device may search the data store where the filtering rules are stored and traverse the filtering rules until a match is found or the filtering rules are exhausted.

At block 408, responsive to a determination that the one or more characteristics match the filtering rule, the processing device may filter (e.g., block, discard) the packet. Discarding the packet may refer to deleting the packet from memory. Blocking the packet may refer to storing the packet in memory of the host without sending the packet to the virtualized execution environment. Additionally or alternatively, responsive to a determination that the filtering rule(s) does not match the one or more characteristics of the packet, the processing device may transmit the packet to the virtualized execution environment. Also, in an implementation, after a predefined time period, the processing device may remove the filtering rule and receive a subsequent packet addressed to the virtualized execution environment. The processing device may transmit the subsequent packet to the virtualized execution environment without determining whether one or more characteristics of the subsequent packet match the filtering rule.

Figure 5A:
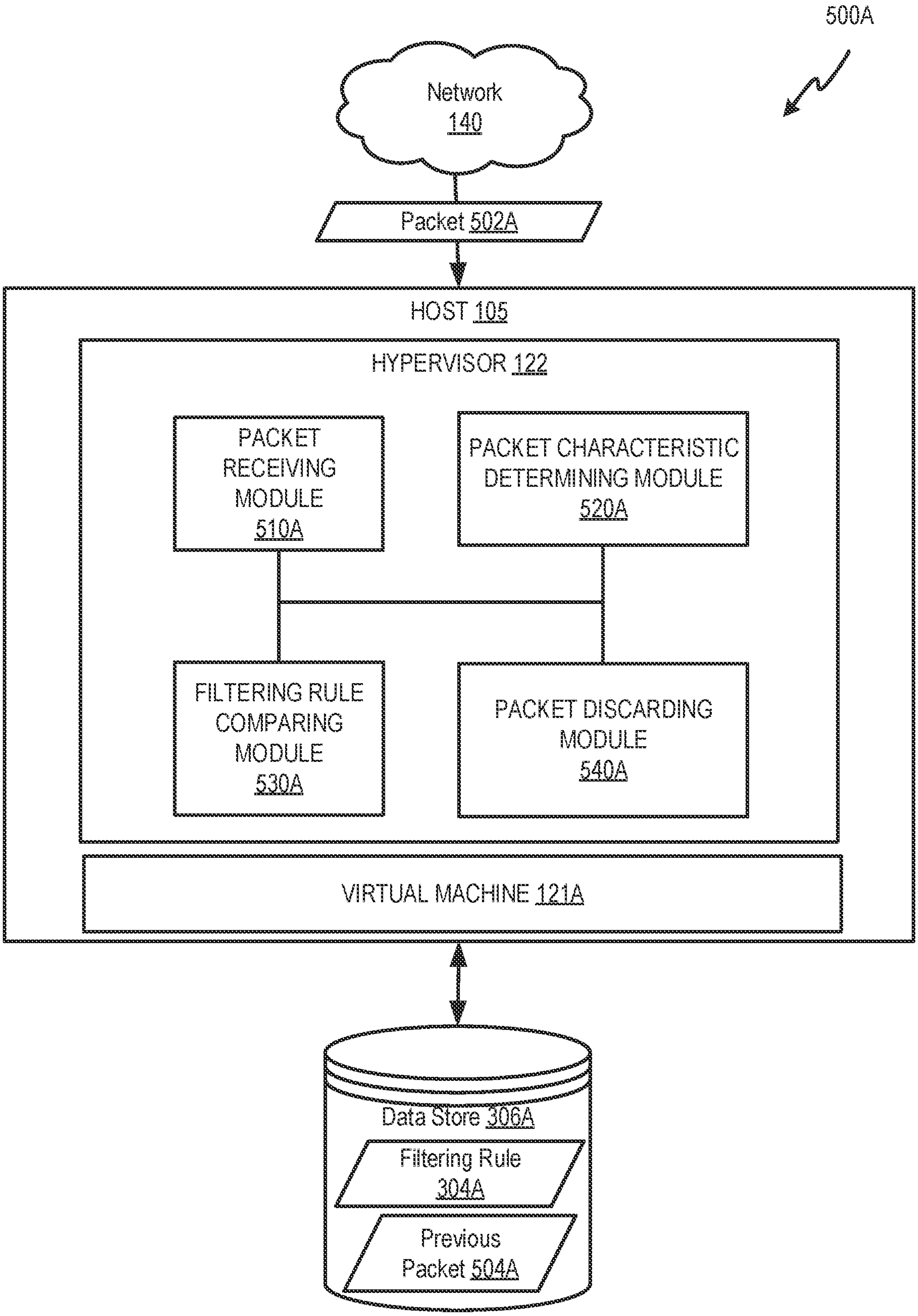
FIG. 5A depicts a block diagram of an example computer system including a virtual machine for performing the method of FIG. 4, in accordance with one or more aspects of the present disclosure.

FIG. 5A depicts a block diagram of an example computer system 500A for performing the method of FIG. 4, in accordance with one or more aspects of the present disclosure. In this illustrative example, the computer system 500A includes the host 105, hypervisor 122, virtual machine 121A, and a data store 306A communicatively coupled to the host 105. As shown, the hypervisor 122 includes a packet receiving module 510A, a packet characteristic determining module 520A, a filtering rule comparing module 530A, and a packet discarding module 540A.

The packet receiving module 510A may receive a packet 502A that is addressed to the virtual machine 121A. The packet 502A may be sent via the network 140 from the packet source 135 (described above with reference to FIG. 1A) The host 105 may receive the packet 502A at the physical NIC 129 and the physical NIC 129 may forward the packet 502A to the hypervisor 122. In some instances, the packet 502A may be addressed to an application on the virtual machine 121A (e.g., application 126A).

The packet characteristic determining module 520A may determine one or more characteristics of the packet 502A. The packet characteristic determining module 520A may inspect the packet to identify the characteristics, such as the source address of the packet 502A (e.g., address of the packet source 135), data types included in the packet 502A, format of the packet 502A, data content in the packet 502A, and the like.

The filtering rule comparing module 530A may compare the one or more characteristics with a filtering rule 304A created in view of a previous packet 504A determined to be malicious by the virtual machine 121A. The filtering rule comparing module 530A may access the data store 306A where the filtering rule 304A is stored and compare the characteristics of the previous packet 504A determined to be malicious with the characteristics of the packet 502A.

The packet discarding module 540A may, responsive to a determination that the one or more characteristics match the filtering rule 304A, discard the packet 502A. In some implementations, the packet discarding module 540A may perform other filtering actions besides discarding, such as blocking the packet 502A.

Figure 5B:
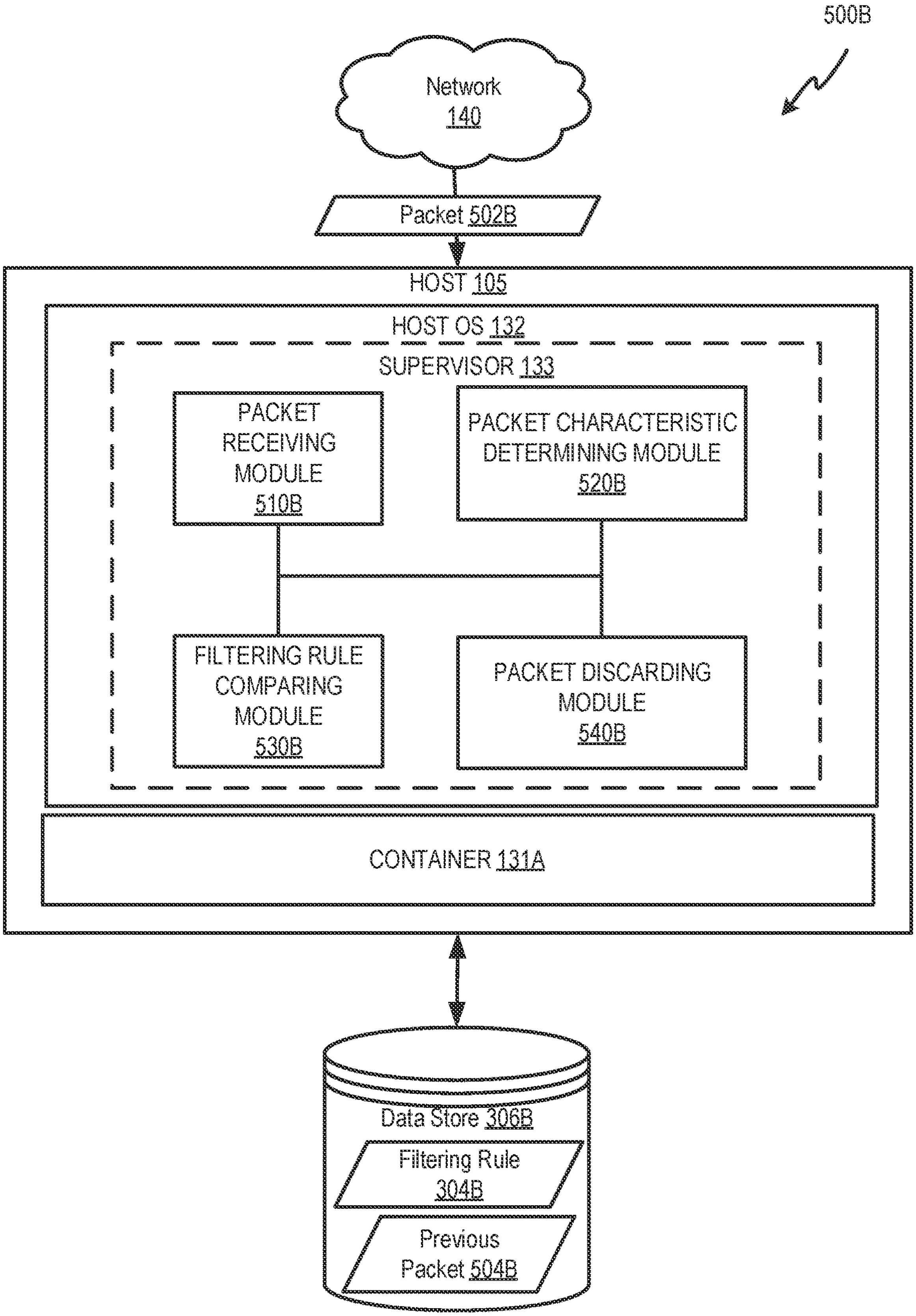
FIG. 5B depicts a block diagram of an example computer system including a container for performing the method of FIG. 4, in accordance with one or more aspects of the present disclosure.

FIG. 5B depicts a block diagram of an example computer system 500B for performing the method of FIG. 4, in accordance with one or more aspects of the present disclosure. In this illustrative example, the computer system 500B includes the host 105, the container 131A including the host OS 132, and the data store 306B communicatively coupled to the host 105. As shown, the host OS 132 includes a packet receiving module 510B, a packet characteristic determining module 520B, a filtering rule comparing module 530B, and a packet discarding module 540B. In some implementations, and as shown, the host OS 132 includes a supervisor 133, and the supervisor 133 includes the modules 510B-540B. In alternative implementations, the host OS 132 does not include the supervisor 133. In some implementations, the supervisor 133 is included in the container 131A.

The packet receiving module 510B may receive a packet 502B that is addressed to the container 131A. The packet 502B may be sent via the network 140 from the packet source 135 (described above with reference to FIG. 1A). The host 105 may receive the packet 502B at the physical NIC 129 and the physical NIC 129 may forward the packet 502B to the host OS 132. In some instances, the packet 502B may be addressed to an application on the container 131A (e.g., application 136A-1).

The packet characteristic determining module 520B may determine one or more characteristics of the packet 502B. The packet characteristic determining module 520B may inspect the packet to identify the characteristics, such as the source address of the packet 502B (e.g., address of the packet source 135), data types included in the packet 502B, format of the packet 502B, data content in the packet 502B, and the like.

The filtering rule comparing module 530B may compare the one or more characteristics with the filtering rule 304B. The filtering rule 304B may be created in view of a previous packet 504B determined to be malicious by the container 131A. The filtering rule comparing module 530 may access the data store 306B where the set of filtering rules 304 is stored and compare the characteristics of the previous packet 504B determined to be malicious with the characteristics of the packet 502B.

The packet discarding module 540B may, responsive to a determination that the one or more characteristics match the filtering rule 304B, discard the packet 502B. In some implementations, the packet discarding module 540 may perform other filtering actions besides discarding, such as blocking the packet 502B.

Figure 6:
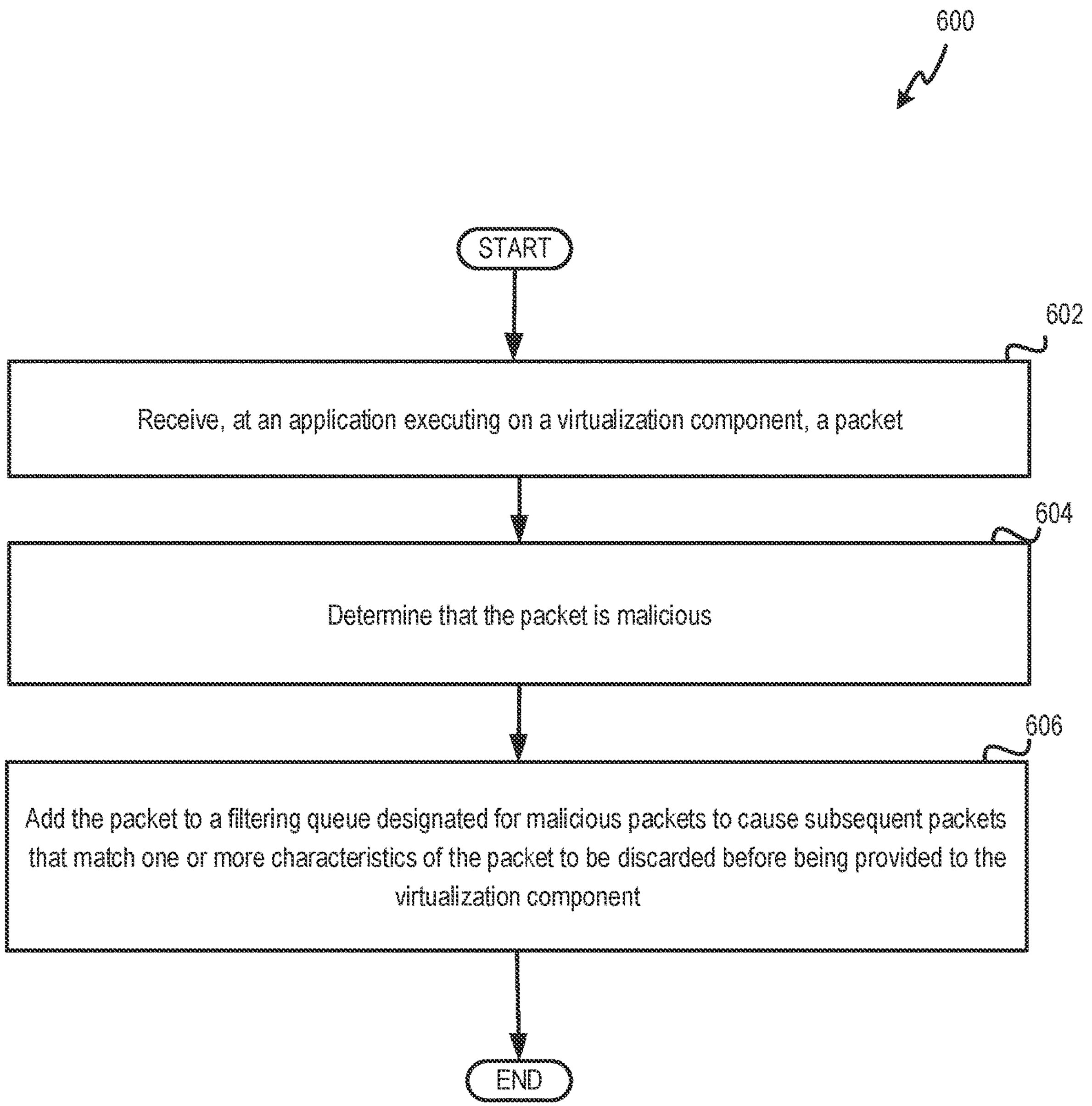
FIG. 6 depicts a flow diagram of an example method for a virtualized execution environment adding a packet determined to be malicious to a filtering queue, in accordance with one or more aspects of the present disclosure.

FIG. 6 depicts a flow diagram of an example method 600 for a virtualized execution environment adding a packet determined to be malicious to a filtering queue, in accordance with one or more aspects of the present disclosure. Method 600 includes operations performed by a host (e.g., the host 105). Also, method 600 may be performed in the same or a similar manner as described above in regards to method 200. Method 600 may be performed by processing devices of the host executing a detecting component of the virtualized execution environment (e.g., detecting component 127A/127B/137A/137B).

Method 600 may begin at block 602. At block 602, the processing device may receive, at an application executing on a virtualized execution environment, a packet. In an implementation, the virtualized execution environment is a virtual machine. In another implementation, the virtualized execution environment is a container. The packet may be sent from a packet source over a network, and the packet may be received by the processing device via a physical NIC that communicates with the network. The physical NIC may have forwarded the packet to the supervisor, and the supervisor may forward the packet to the application on the virtualized execution environment. The packet may include a destination address of the application.

At block 604, the processing device may determine that the packet is malicious. The processing device may use any suitable technique for determining whether the packet is malicious. For example, the processing device may look at patterns in the data of the packet to determine whether unexpected data is being used in the packet. The processing device may use machine learning that trains a model with malicious packets and uses the model to process the packet and predict whether the packet is malicious. In an implementation, the processing device may add metadata to the packet determined to be malicious prior to adding the packet to the filtering queue. The metadata may include at least a type of malicious packet, the source address of the sender of the packet, and the like.

At block 606, the processing device may add the packet determined to be malicious to the filtering queue designated for malicious packets to cause subsequent packets that match one or more characteristics of the packet to be discarded before being provided to the virtualized execution environment. As discussed above, in an implementation, the virtualized execution environment is a virtual machine and the filtering queue may be located in a virtual NIC of the virtual machine. In another implementation, the virtualized execution environment is a container and the filtering queue may be located in a software NIC of the container.

In an implementation, to regulate the flow of packets to the hypervisor or host OS (e.g., supervisor) via the filtering queue, the processing device may store packets determined to be malicious in a data store of the virtualized execution environment. Responsive to determining that a number of packets in the data store exceeds a threshold, the processing device may add the packets in the data store to the filtering queue. In some instances, the threshold may be an 8-bit counter that tracks how many packets have accumulated in the data store.

Figure 7:
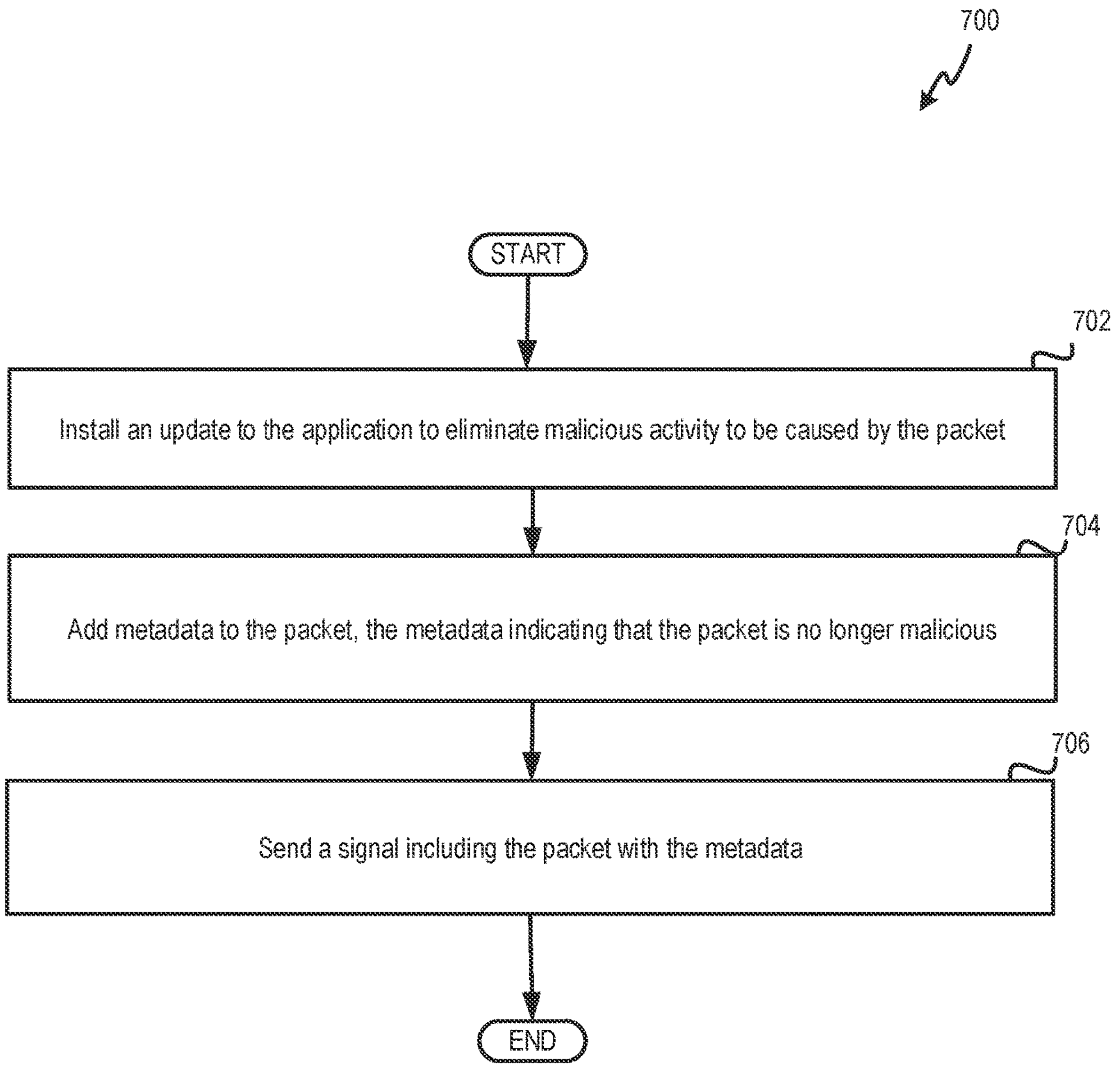
FIG. 7 depicts a flow diagram of an example method for a virtualized execution environment sending a signal indicating that a packet is no longer malicious, in accordance with one or more aspects of the present disclosure.

FIG. 7 depicts a flow diagram of an example method 700 for a virtualized execution environment sending a signal indicating that a packet is no longer malicious to a supervisor, in accordance with one or more aspects of the present disclosure. Method 700 includes operations performed by the host (e.g., host 105 of FIG. 1A). Also, method 700 may be performed in the same or a similar manner as described above in regards to method 200. Method 700 may be performed by processing devices of the host executing a detecting component (e.g., detecting components 127A, 127B, 137A and/or 137B). For clarity, the below discussion regarding the method 700 focuses on a single detecting component of a single virtualized execution environment.

Method 700 may begin at block 702. At block 702, the processing device installs an update to the application 126A to eliminate malicious activity to be caused by the packet. The update may be a patch or one or more files including computer instructions received by the application 126A via the network 140 (e.g., downloaded via the Internet).

At block 704, the processing device may add metadata to the packet that was previously determined to be malicious. The metadata may indicate that the packet is no longer malicious.

At block 706, the processing device may send a signal including the packet with the metadata. For example, the signal can be sent to a hypervisor or host OS (e.g., supervisor). The signal may cause the hypervisor or host OS (e.g., supervisor) to disable a filtering rule updated with the packet previously determined to be malicious and/or update one or more models used to match characteristics of packets for the filtering rules.

Figure 8:
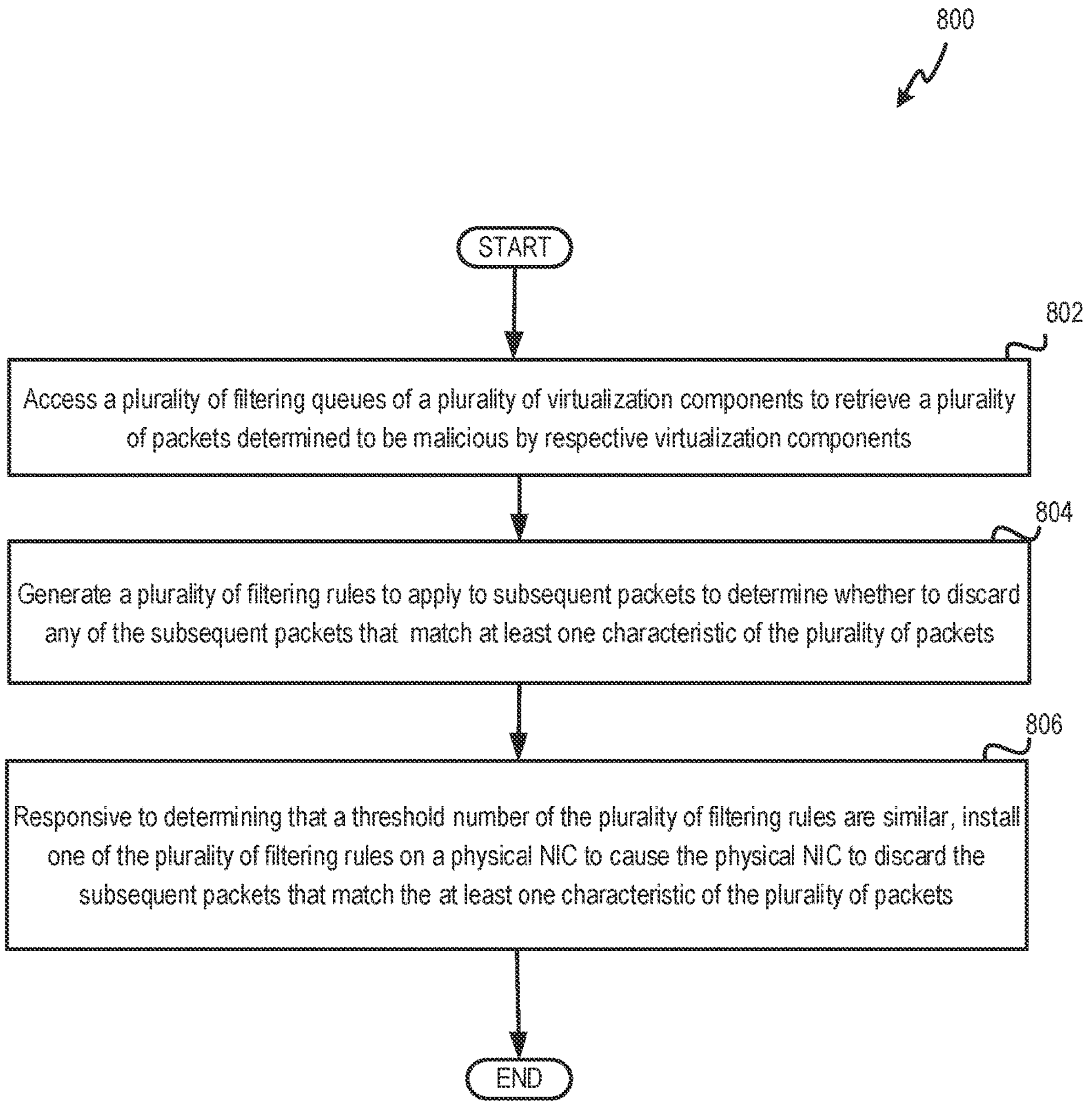
FIG. 8 depicts a flow diagram of an example method for installing a filtering rule on a physical network interface card (NIC), in accordance with one or more aspects of the present disclosure.

FIG. 8 depicts a flow diagram of an example method 800 for installing a filtering rule on a physical network interface card (NIC), in accordance with one or more aspects of the present disclosure. Method 800 includes operations performed by a host (e.g., host 105 of FIG. 1A). Also, method 800 may be performed in the same or a similar manner as described above in regards to method 200. Method 800 may be performed by processing devices of the host executing a filtering component of a hypervisor or host OS (e.g., supervisor).

Method 800 may begin at block 802. At block 802, the processing device may access a plurality of filtering queues of virtualized execution environments to retrieve a plurality of packets determined to be malicious by respective virtualized execution environments. The virtualized execution environments can include one or virtual machines and/or one or more containers. The plurality of filtering queues may be designated for packets that are determined to be malicious by detecting components. Further, each filtering queue of the plurality of filtering queues may be located in the virtual and/or software NICs of the respective virtualized execution environments.

In an implementation, applications on each virtualized execution environment of the plurality of virtualized execution environments flag a respective packet of the plurality of packets as malicious and adds the respective packet to a respective filtering queue. Prior to adding the packets to the filtering queues, the applications may include metadata (e.g., type of malicious packet, source address of the packet, etc.) in the respective packet.

At block 804, the processing device may generate a plurality of filtering rules to apply to subsequent packets to determine whether to discard any of the subsequent packets that match at least one characteristic of the plurality of packets. The plurality of filtering rules may be stored in the data store 306.

At block 806, responsive to determining that a threshold number of the plurality of filtering rules are similar, the processing device may install one of the plurality of filtering rules on a physical NIC to cause the physical NIC to discard the subsequent packets that match the at least one characteristic of the plurality of packets. Additionally or alternatively, the processing device may determine that the characteristics of the packets retrieved from the filtering queues are similar and may generate a single rule that is then installed on the physical NIC. The physical NIC may receive a packet subsequently to the filtering rule being installed on the physical NIC. Responsive to determining that the subsequent packet matches the at least one characteristic of the plurality of packets, the processing device may apply the rule to discard the subsequent packet.

In an implementation, the processing device may disable (e.g., remove, temporarily suspend) the filtering rule from the physical NIC after a predefined time period. The processing device may receive subsequent packets that match characteristics in the disabled filtering rule from the physical NIC. Further, the processing device may send the subsequent packets to the plurality of virtualized execution environments to facilitate determinations of whether the subsequent packets are malicious.

Figure 9A:
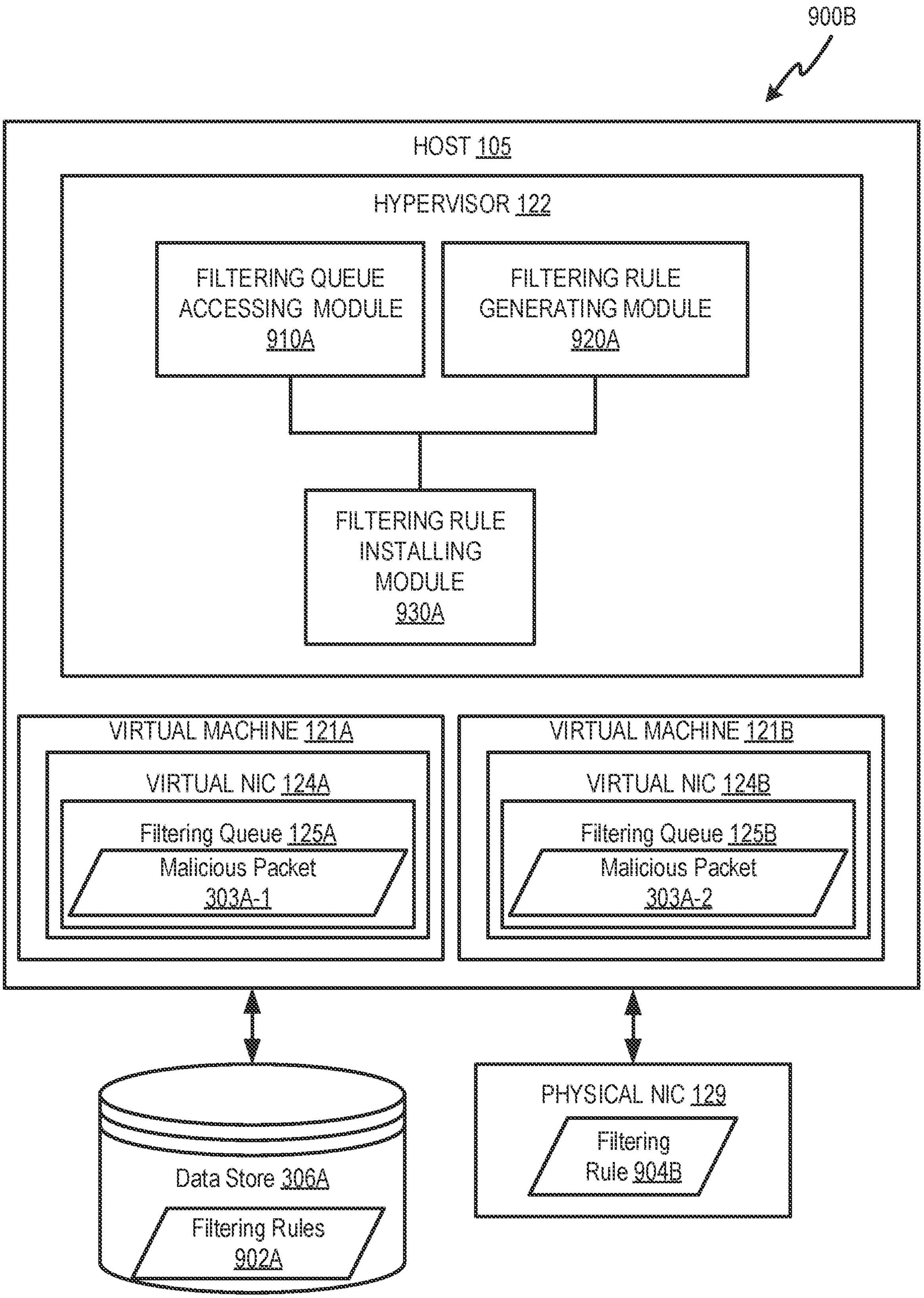
FIG. 9A depicts a block diagram of an example computer system including virtual machines for performing the method of FIG. 8, in accordance with one or more aspects of the present disclosure.

FIG. 9A depicts a block diagram of an example computer system 900A for performing the method of FIG. 8, in accordance with one or more aspects of the present disclosure. In this illustrative example, the computer system 900A includes the host 105, hypervisor 122, virtual machines 121A and 121B, the data store 306A communicatively coupled to the host 105, and the physical NIC 129 communicatively coupled to the host 105. Although the physical NIC 129 is shown as separate from the host 105, the physical NIC 129 can be located within the host 105. As further shown, the hypervisor 122 includes a filtering queue accessing module 910A, a filtering rule generating module 920A, and filtering rule installing module 930A.

The filtering queue accessing module 910A may access a plurality of filtering queues of the virtual machines 121A and 121B to retrieve a plurality of packets determined to be malicious. For example, as depicted, the filtering queue accessing module 910A may access filtering queue 125A and 125B to retrieve the malicious packets 303A-1 and 303A-2.

The filtering rule generating module 920A may generate a plurality of filtering rules 902A to apply to subsequent packets to determine whether to discard any of the subsequent packets that match at least one characteristic of the plurality of packets. The filtering rules 902A may be stored in the data store 306A.

The filtering rule installing module 930 may, responsive to determining that a threshold number of the filtering rules 902 are similar, the processing device may install at least one of the plurality of filtering rules (e.g., filtering rule 904A) on the physical NIC 129 to cause the physical NIC 129 to discard the subsequent packets that match the at least one characteristic of the malicious packets 303A-1 and 303A-2. Additionally or alternatively, the filtering rule installing module 930 may determine that the characteristics of the packets retrieved from the filtering queues 125A and 125B are similar and may generate the filtering rule 904A that is installed on the physical NIC 129.

Figure 9B:
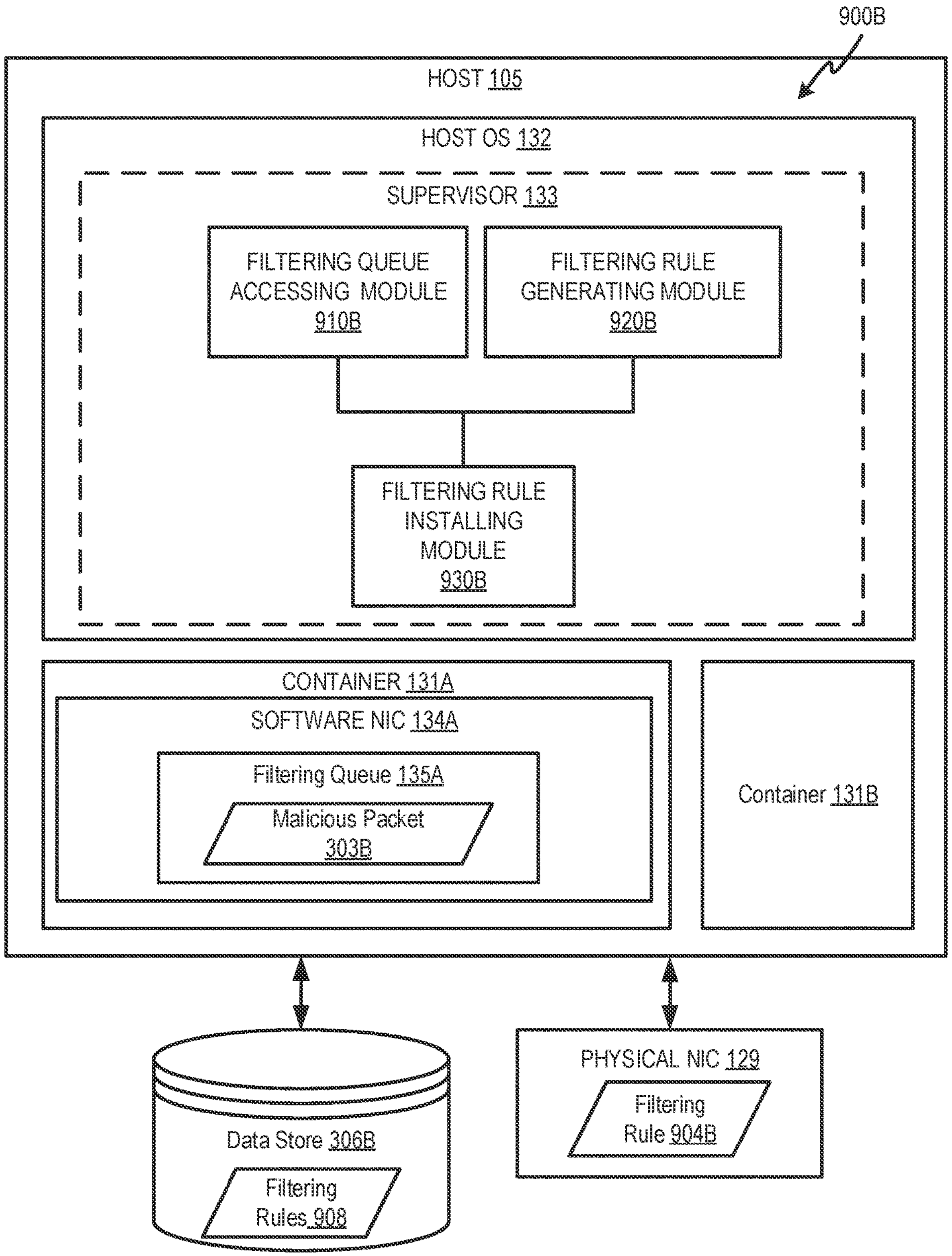
FIG. 9B depicts a block diagram of an example computer system including containers for performing the method of FIG. 8, in accordance with one or more aspects of the present disclosure.

FIG. 9B depicts a block diagram of an example computer system 900B for performing the method of FIG. 8, in accordance with one or more aspects of the present disclosure. In this illustrative example, the computer system 900B includes the host 105, containers 131A and 131B, the data store 306A communicatively coupled to the host 105, and the physical NIC 129 communicatively coupled to the host 105. Although the physical NIC 129 is shown as separate from the host 105, the physical NIC 129 can be located within the host 105. As further shown, the hypervisor 122 includes a filtering queue accessing module 910B, a filtering rule generating module 920B, and filtering rule installing module 930B. In some implementations, and as shown, the host OS 132 includes a supervisor 133, and the supervisor 133 includes the modules 910B-930B. In alternative implementations, the host OS 132 does not include the supervisor 133. In some implementations, the supervisor 133 is included in the container 131A and/or container 131B.

The filtering queue accessing module 910B may access a plurality of filtering queues of the containers 131A and 131B to retrieve a plurality of packets determined to be malicious. For example, as depicted, the filtering queue accessing module 910B may access filtering queue 135A to retrieve the malicious packet 303B.

The filtering rule generating module 920B may generate a plurality of filtering rules 902B to apply to subsequent packets to determine whether to discard any of the subsequent packets that match at least one characteristic of the plurality of packets. The filtering rules 902B may be stored in the data store 306B.

The filtering rule installing module 930 may, responsive to determining that a threshold number of the filtering rules 902 are similar, the processing device may install at least one of the plurality of filtering rules (e.g., filtering rule 904B) on the physical NIC 129 to cause the physical NIC 129 to discard the subsequent packets that match the at least one characteristic of the malicious packet 303B. Additionally or alternatively, the filtering rule installing module 930 may determine that the characteristics of the packets retrieved from the filtering queues 135A and 135B are similar and may generate the filtering rule 904B that is installed on the physical NIC 129.

Figure 10:
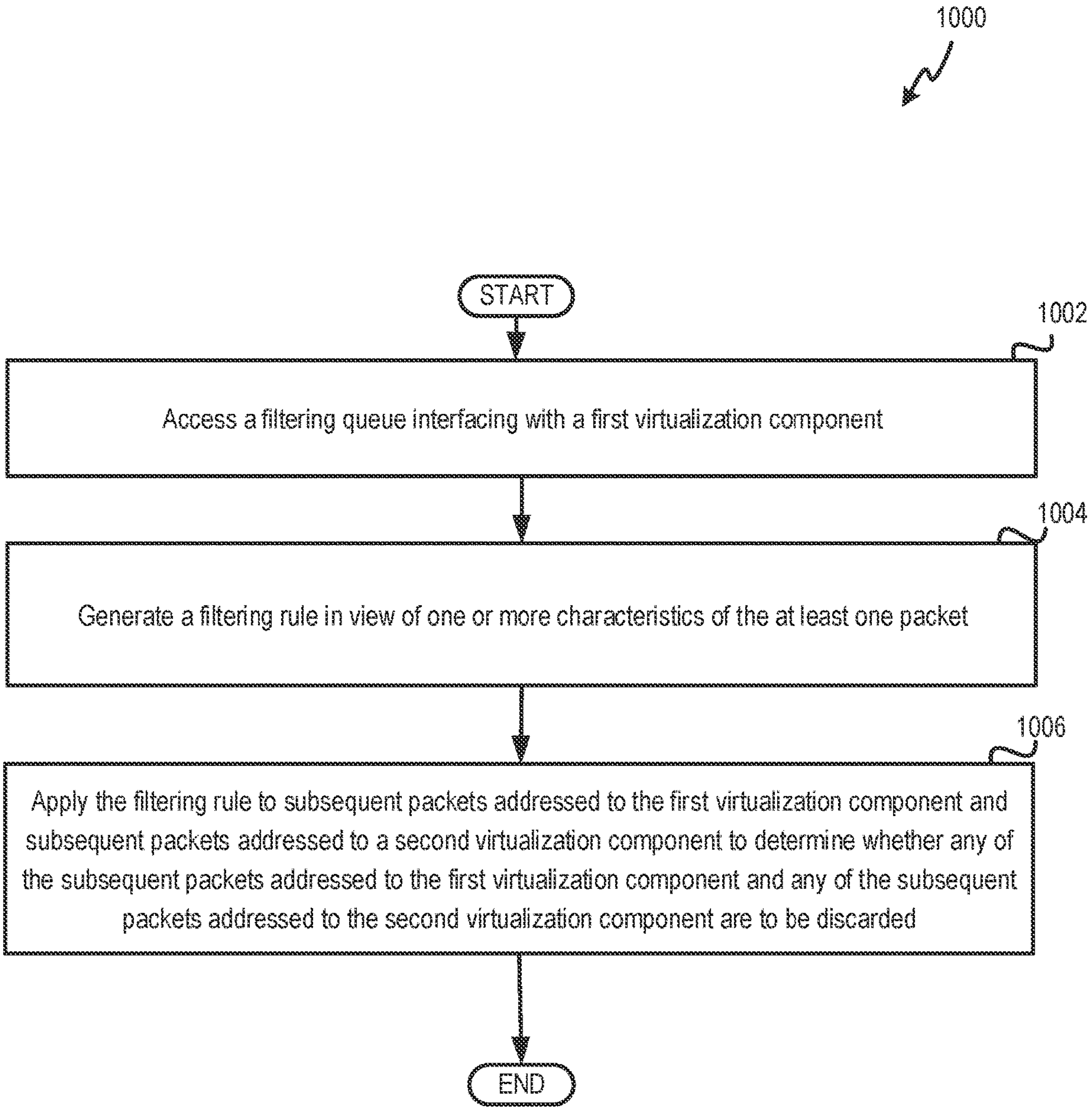
FIG. 10 depicts a flow diagram of an example method for applying a filtering rule to a first virtualized execution environment and a second virtualized execution environment, in accordance with one or more aspects of the present disclosure.

FIG. 10 depicts a flow diagram of an example method 1000 for applying a filtering rule to a first virtualized execution environment and a second virtualized execution environment, in accordance with one or more aspects of the present disclosure. Method 1000 includes operations performed by a host (e.g., host 105 of FIG. 1A). Also, method 1000 may be performed in the same or a similar manner as described above in regards to method 200. Method 1000 may be performed by processing devices of the host executing a filtering component of a hypervisor and/or host OS (e.g., supervisor).

Method 1000 may begin at block 1002. At block 1002, the processing device may access a filtering queue interfacing with a first virtualized execution environment. In an implementation, at least one of the first virtualized execution environment or the second virtualized execution environment is a virtual machine, and the filtering queue may be located in a virtual NIC of the virtual machine. In another implementation, at least one of the first virtualized execution environment or the second virtualized execution environment is a container, and the filtering queue may be located in a software NIC of the container. The filtering queue may provide a channel between the supervisor and the first virtualized execution environment for forwarding malicious packets from the first virtualized execution environment to the supervisor.

At block 1004, the processing device may generate a filtering rule in view of one or more characteristics of the at least one packet. At block 1006, the processing device may apply the filtering rule to subsequent packets addressed to the first virtualized execution environment and subsequent packets addressed to a second virtualized execution environment to determine whether any of the subsequent packets addressed to the virtualized execution environment and any of the subsequent packets addressed to the second virtualized execution environment are to be discarded. In an implementation, the first virtualized execution environment and the second virtualized execution environment satisfy a trust condition that verifies whether the first virtualized execution environment and the second virtualized execution environment are owned by the same user, for example. In an implementation, the second virtualized execution environment is a virtual machine. In another implementation, the second virtualized execution environment is a container.

Figure 11A:
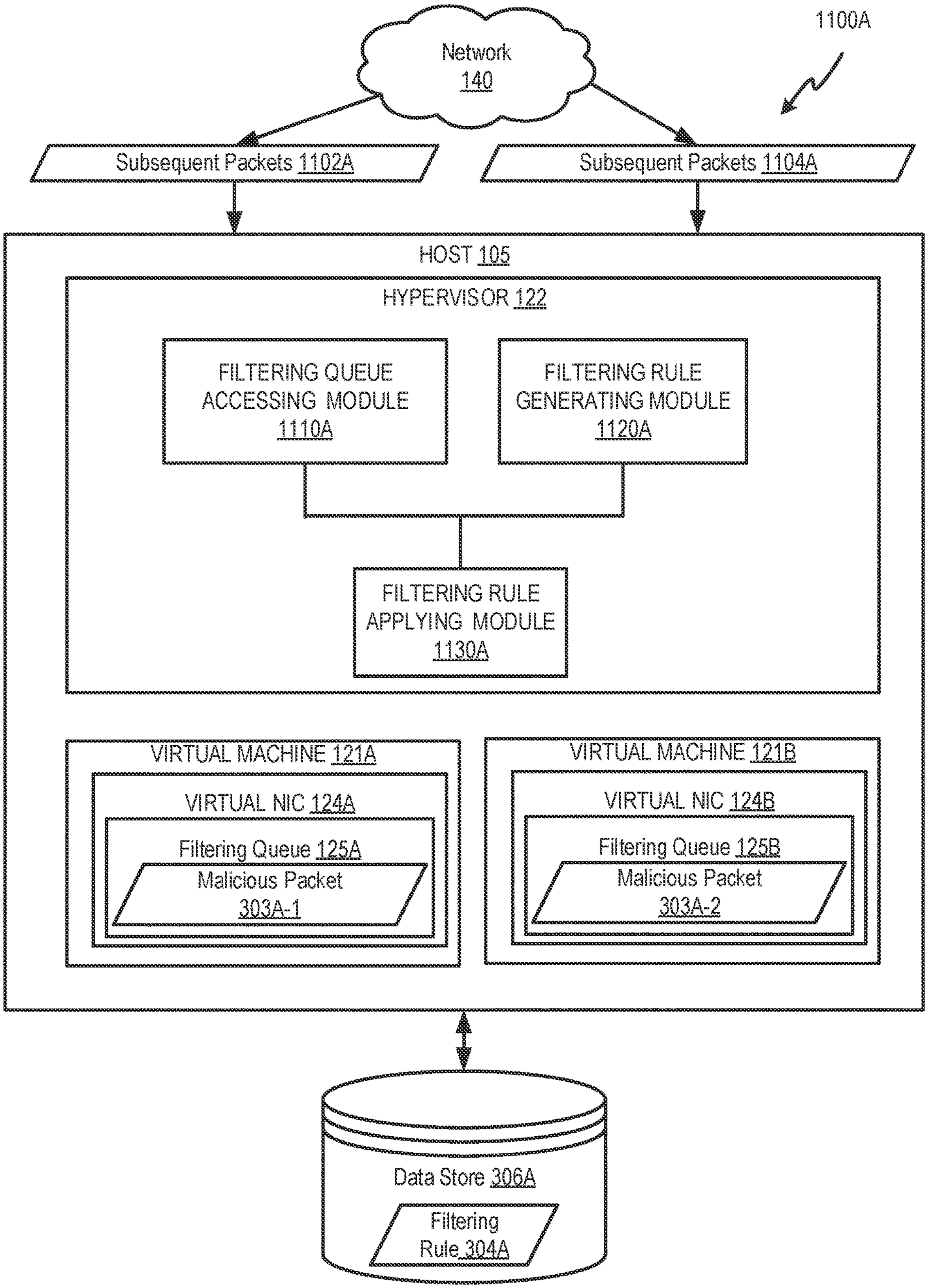
FIG. 11A depicts a block diagram of an example computer system including virtual machines for performing the method of FIG. 10, in accordance with one or more aspects of the present disclosure.

FIG. 11A depicts a block diagram of an example computer system 1100A for performing the method of FIG. 10, in accordance with one or more aspects of the present disclosure. In this illustrative example, the computer system 1100A includes the host 105, hypervisor 122, virtual machines 121A and 121B, and the data store 306A communicatively coupled to the host 105. As further shown, the hypervisor 122 includes a filtering queue accessing module 1110A, a filtering rule generating module 1120A, and filtering rule applying module 1130A.

The filtering queue accessing module 1110A may access the filtering queue 125A of the virtual machine 121A. The filtering queue 125A may store at least one malicious packet 303A-1 and the filtering queue 125B may store at least one malicious packet 303A-2. The filtering queue accessing module 1110A may retrieve the malicious packet 303A-1 from the filtering queue 125A.

The filtering rule generating module 1120A may generate a filtering rule 304A in view of one or more characteristics of the malicious packet 303A-1 and the filtering rule 304A may be stored in the data store 306A.

The filtering rule applying module 1130A may apply the filtering rule 304A to subsequent packets 1102A addressed to the virtual machine 121A and subsequent packets 1104A addressed to the virtual machine 121B to determine whether any of the subsequent packets 1102A and/or subsequent packets 1104A are to be discarded. As discussed above, the virtual machine 121A and the virtual machine 121B may satisfy a trust condition before applying the filtering rule 304A to any packets addressed to the virtual machine 121B. The packets 1102A and 1104A may be sent from the packet source 135. In another example, the packets 1102A and 1104A may be sent from different sources.

Figure 11B:
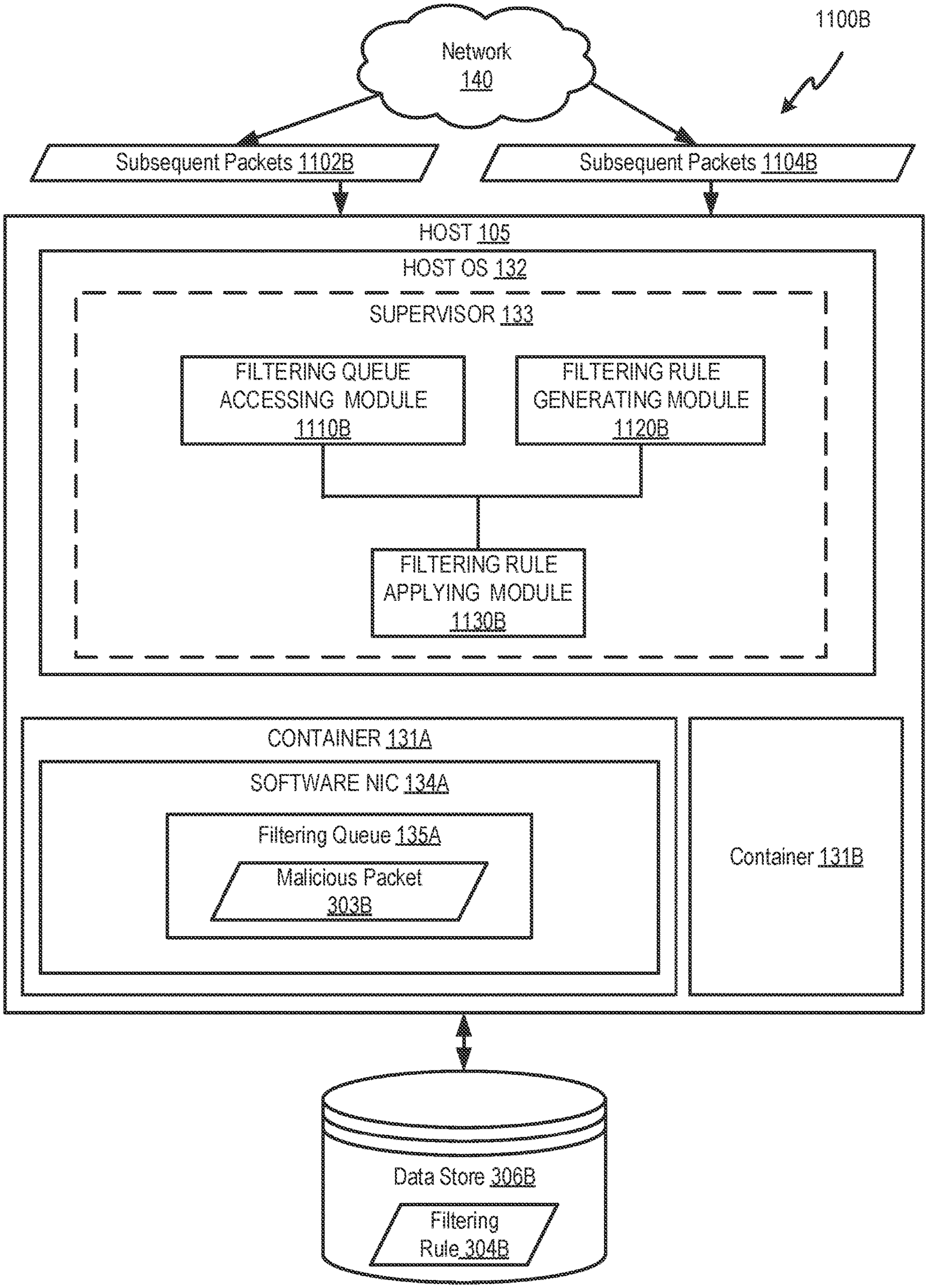
FIG. 11B depicts a block diagram of an example computer system including containers for performing the method of FIG. 10, in accordance with one or more aspects of the present disclosure.

FIG. 11B depicts a block diagram of an example computer system 1100B for performing the method of FIG. 10, in accordance with one or more aspects of the present disclosure. In this illustrative example, the computer system 1100B includes the host 105, containers 131A and 131B, and the data store 306B communicatively coupled to the host 105. As further shown, the host OS 132 includes a filtering queue accessing module 1110B, a filtering rule generating module 1120B, and filtering rule applying module 1130B. In some implementations, and as shown, the host OS 132 includes a supervisor 133, and the supervisor 133 includes the modules 1110B-1130B. In alternative implementations, the host OS 132 does not include the supervisor 133. In some implementations, the supervisor 133 is included in the container 131A and/or the container 131B.

The filtering queue accessing module 1110B may access the filtering queue 135A of the container 131A. The filtering queue 135A may store at least one malicious packet 303B. The filtering queue accessing module 1110B may retrieve the malicious packet 303B from the filtering queue 125B.

The filtering rule generating module 1120B may generate a filtering rule 304B in view of one or more characteristics of the malicious packet 303B and the filtering rule 304B may be stored in the data store 306B.

The filtering rule applying module 1130B may apply the filtering rule 304B to subsequent packets 1102B addressed to the container 131A and subsequent packets 1104B addressed to the container 131B to determine whether any of the subsequent packets 1102B and/or subsequent packets 1104B are to be discarded. As discussed above, the container 131A and the container 131B may satisfy a trust condition before applying the filtering rule 304B to any packets addressed to the container 131B. The packets 1102B and 1104B may be sent from the packet source 135. In another example, the packets 1102B and 1104B may be sent from different sources.

Figure 12:
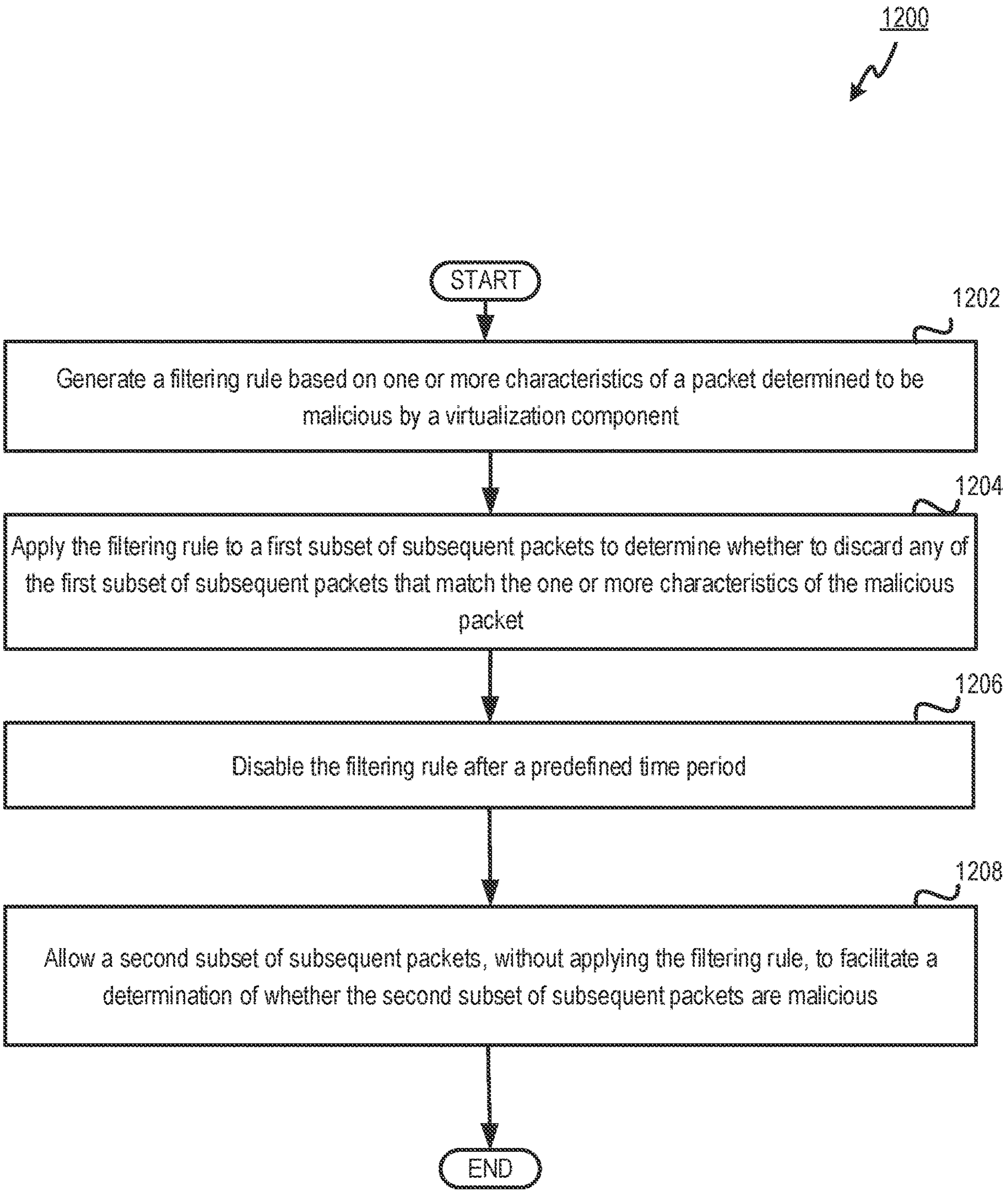
FIG. 12 depicts a flow diagram of an example method for disabling a filtering rule to facilitate determine of whether packets are malicious, in accordance with one or more aspects of the present disclosure.

FIG. 12 depicts a flow diagram of an example method 1200 for applying a filtering rule to virtualized execution environments, in accordance with one or more aspects of the present disclosure. Method 1200 includes operations performed by a host (e.g., host 105 of FIG. 1A). Also, method 1200 may be performed in the same or a similar manner as described above in regards to method 200. Method 1200 may be performed by processing devices of the host executing a filtering component.

Method 1200 may begin at block 1202. At block 1202, the processing device may generate a filtering rule in view of one or more characteristics of a packet determined to be malicious by a virtualized execution environment. In an implementation, the virtualized execution environment includes a hypervisor. In another implementation, the virtualized execution environment includes a container. The malicious packet may be retrieved from a filtering queue.

At block 1204, the processing device may apply the filtering rule to a first subset of subsequent packets to determine whether to discard any of the first subset of subsequent packets that match the one or more characteristics of the malicious packet.

At block 1206, the processing device may disable the filtering rule after a predefined time period. For example, disabling the filtering rule may refer to removing the filtering rule or temporarily disabling the filtering rule. In instances where the filtering rule is temporarily disabled, the filtering rule may be reactivated after another predefined time period.

At block 1208, the processing device may allow a second subset of subsequent packets, without applying the filtering rule, to facilitate a determination of whether the second subset of subsequent packets are malicious. In some instances, the virtualized execution environment may determine that the packets are not malicious. If the packets are determined to no longer be malicious, the virtualized execution environment may send a signal to the hypervisor or host OS (e.g., supervisor) indicating such. If the packets are determined to be malicious, the virtualized execution environment may add the malicious packet to the filtering queue and the hypervisor or host OS (e.g., supervisor) may generate another filtering rule or reactivate the previously disabled filtering rule.

Figure 13A:
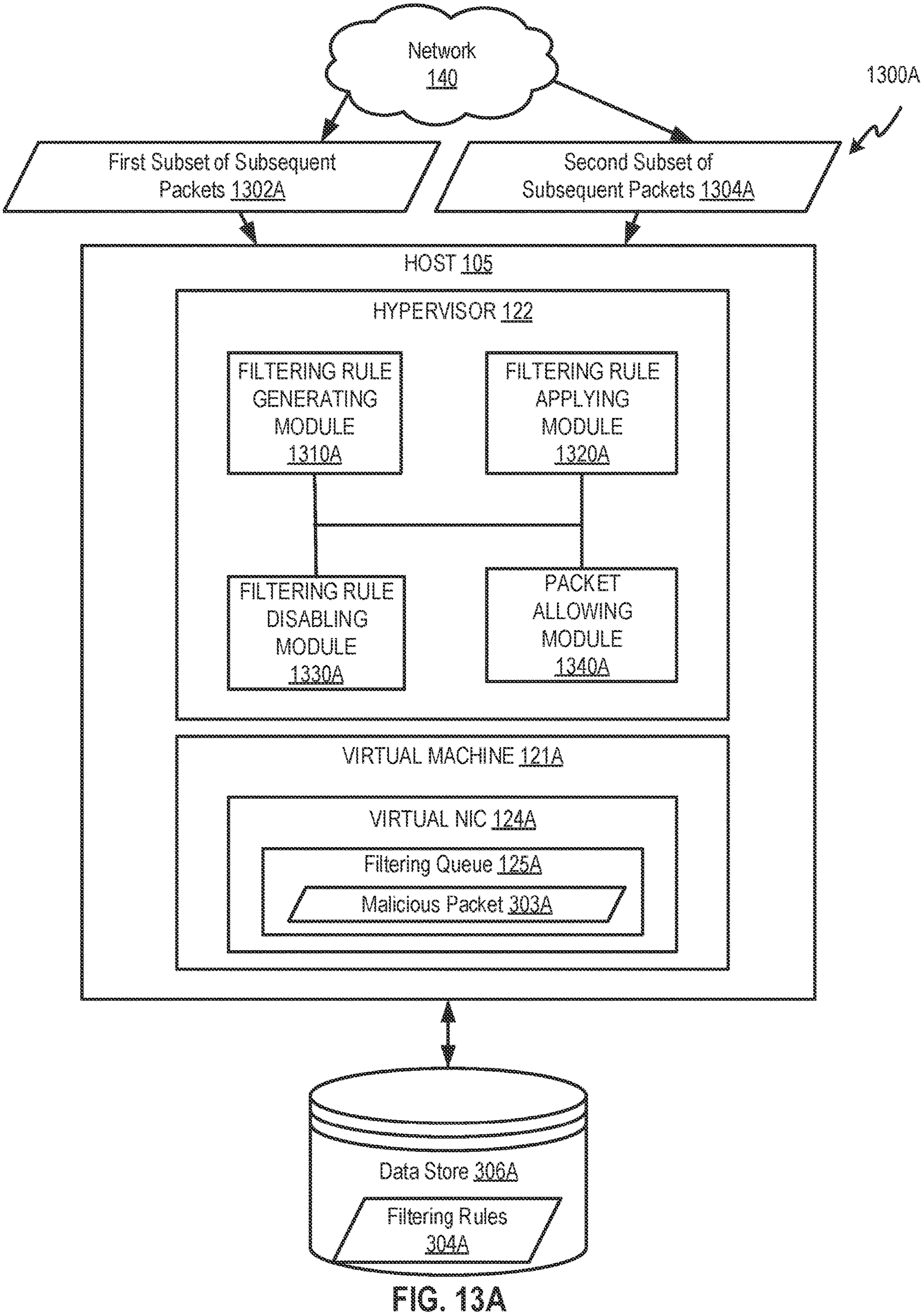
FIG. 13A depicts a block diagram of an example computer system including a virtual machine for performing the method of FIG. 12, in accordance with one or more aspects of the present disclosure.

FIG. 13A depicts a block diagram of an example computer system 1300A for performing the method of FIG. 12, in accordance with one or more aspects of the present disclosure. In this illustrative example, the computer system 1300A includes the host 105, hypervisor 122, virtual machine 121A, and the data store 306A communicatively coupled to the host 105. As shown, the hypervisor 122 includes a filtering rule generating module 1310A, a filtering rule applying module 1320A, a filtering rule disabling module 1330A, and a packet allowing module 1340A.

The filtering rule generating module 1310A may generate at least one filtering rule 304A in view of one or more characteristics of at least one malicious packet 303A retrieved from the filtering queue 125A. The malicious packet 303A may be determined to be malicious by the virtual machine 121A (e.g., detecting component 127A). The filtering rule 304A may be stored in the data store 306A.

The filtering rule applying module 1320A may apply the filtering rule 304A to a first subset of subsequent packets 1302A to determine whether to discard any of the first subset of subsequent packets 1302A that match the one or more characteristics of the malicious packet.

The filtering rule disabling module 1330A may disable the filtering rule 304A after a predefined time period. For example, the filtering rule disabling module 1330A may remove or temporarily suspend the filtering rule 304A.

The packet allowing module 1340A may allow a second subset of subsequent packets 1304A without applying the filtering rule 304A to facilitate a determination of whether the second subset of subsequent packets 1304A are malicious. In some instances, the virtual machine 121A may determine that the packets are not malicious. If the packets are determined to no longer be malicious, the virtual machine 121A may send a signal to the hypervisor 122 indicating such. In an implementation where the filtering rule 304A has been temporarily suspended, the signal may enable the hypervisor 122 to remove the filtering rule 304A such that it is not reactivated to filter the packets that are no longer malicious. However, it should be noted that the signal may not be sent in some implementations where the filtering rule 304A has been temporarily suspended.

In other implementations, when the filtering rule 304A has been removed, the virtual machine 121A may not provide a signal to the hypervisor 122 because the filtering rule 304A has already been removed. However, it should be understood that the signal may also be sent in instances where the filtering rule 304A has been removed to enable the hypervisor 122 to improve its filtering techniques. If the packets are determined to be malicious, the virtual machine 121A may add the malicious packet to the filtering queue 125A and the hypervisor 122 may generate another filtering rule or reactivate the previously disabled filtering rule.

Figure 13B:
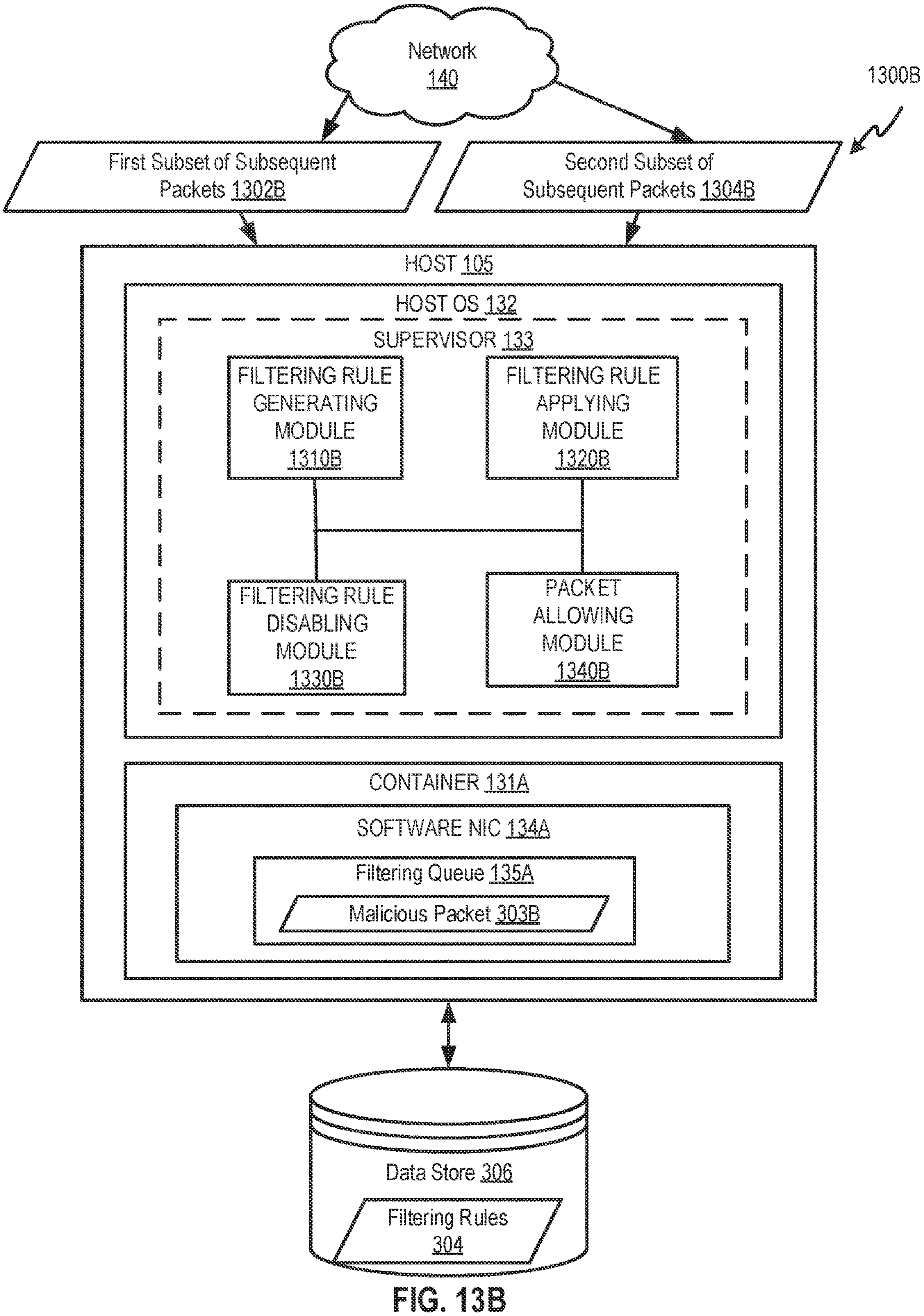
FIG. 13B depicts a block diagram of an example computer system including a container for performing the method of FIG. 12, in accordance with one or more aspects of the present disclosure.

FIG. 13B depicts a block diagram of an example computer system 1300B for performing the method of FIG. 12, in accordance with one or more aspects of the present disclosure. In this illustrative example, the computer system 1300B includes the host 105, the container 131A, and the data store 306A communicatively coupled to the host 105. As shown, the host OS 132 includes a filtering rule generating module 1310B, a filtering rule applying module 1320B, a filtering rule disabling module 1330B, and a packet allowing module 1340B. In some implementations, and as shown, the host OS 132 includes a supervisor 133, and the supervisor 133 includes the modules 1310B-1340B. In alternative implementations, the host OS 132 does not include the supervisor 133. In some implementations, the supervisor 133 is included in the container 131A.

The filtering rule generating module 1310B may generate at least one filtering rule 304B in view of one or more characteristics of at least one malicious packet 303B retrieved from the filtering queue 135A. The malicious packet 303B may be determined to be malicious by the container 131 (e.g., detecting component 137A). The filtering rule 304B may be stored in the data store 306B.

The filtering rule applying module 1320B may apply the filtering rule 304B to a first subset of subsequent packets 1302B to determine whether to discard any of the first subset of subsequent packets 1302B that match the one or more characteristics of the malicious packet.

The filtering rule disabling module 1330B may disable the filtering rule 304B after a predefined time period. For example, the filtering rule disabling module 1330B may remove or temporarily suspend the filtering rule 304B.

The packet allowing module 1340B may allow a second subset of subsequent packets 1304B without applying the filtering rule 304B to facilitate a determination of whether the second subset of subsequent packets 1304B are malicious. In some instances, the container 131A may determine that the packets are not malicious. If the packets are determined to no longer be malicious, the container 131A may send a signal indicating such (e.g., via the host OS 132). In an implementation where the filtering rule 304B has been temporarily suspended, the signal may enable the host OS 132 to remove the filtering rule 304B such that it is not reactivated to filter the packets that are no longer malicious. However, it should be noted that the signal may not be sent in some implementations where the filtering rule 304B has been temporarily suspended.

In other implementations, when the filtering rule 304B has been removed, the container 131A may not provide a signal because the filtering rule 304B has already been removed. However, it should be understood that the signal may also be sent in instances where the filtering rule 304B has been removed to enable the host OS 132 to improve its filtering techniques. If the packets are determined to be malicious, the container 131A may add the malicious packet to the filtering queue 135A and may generate another filtering rule or reactivate the previously disabled filtering rule.

Figure 14:
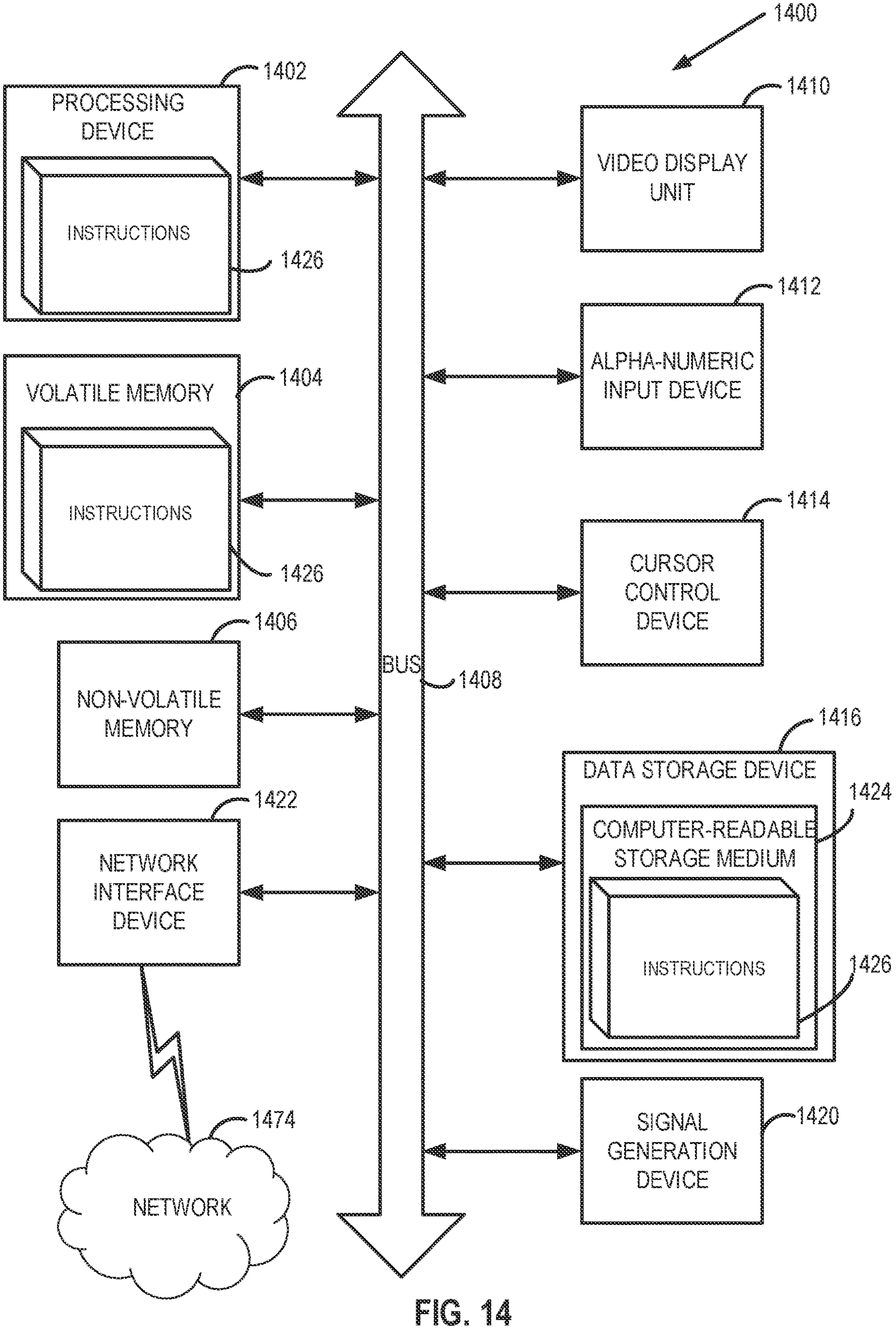
FIG. 14 depicts a block diagram of an illustrative computing device operating in accordance with the examples of the present disclosure.

FIG. 14 depicts a block diagram of a computer system operating in accordance with one or more aspects of the present disclosure. In various illustrative examples, computer system 1400 may correspond to a computing device within system architecture 100 of FIG. 1. In one implementation, the computer system 1400 may be the host 105. The computer system 1400 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host system to translate these requests to the underlying physical computing hardware resources. This type of virtualization results in multiple VMs sharing physical resources.

In certain implementations, computer system 1400 may be connected (e.g., via a network, such as a Local Area Network (LAN), an intranet, an extranet, or the Internet) to other computer systems. Computer system 1400 may operate in the capacity of a server or a client computer in a client-server environment, or as a peer computer in a peer-to-peer or distributed network environment. Computer system 1400 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1400 may include a processing device 1402, a volatile memory 1404 (e.g., random access memory (RAM)), a non-volatile memory 1406 (e.g., read-only memory (ROM) or electrically-erasable programmable ROM (EEPROM)), and a data storage device 1416, which may communicate with each other via a bus 1408.

Processing device 1402 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1400 may further include a network interface device 1422. Computer system 1400 also may include a video display unit 1410 (e.g., an LCD), an alphanumeric input device 1412 (e.g., a keyboard), a cursor control device 1414 (e.g., a mouse), and a signal generation device 1420.

Data storage device 1416 may include a non-transitory computer-readable storage medium 1424 on which may store instructions 1426 encoding any one or more of the methods or functions described herein, including instructions implementing filtering component 128 of FIG. 1 for implementing methods 200, 400, 800, 1000, and 1200, and implementing VM detecting component 127A and 127B for implementing methods 600 and 700.

Instructions 1426 may also reside, completely or partially, within volatile memory 1404 and/or within processing device 1402 during execution thereof by computer system 1400, hence, volatile memory 1404 and processing device 1402 may also constitute machine-readable storage media.

While computer-readable storage medium 1424 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 200, 400, 600, 700, 800, 1000, and 1200, and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

Other computer system designs and configurations may also be suitable to implement the systems and methods described herein. The following examples illustrate various implementations in accordance with one or more aspects of the present disclosure.

Example 1 is a method, comprising: receiving, by a processing device, a first packet addressed to a first virtualized execution environment; determining, by the processing device, whether the first packet has similar characteristics with a second packet by applying a first filtering rule to the first packet, wherein the first filtering rule is generated in view of characteristics of the second packet, and wherein the second packet is stored in a first filtering queue of a second virtualized execution environment; and responsive to determining that the first packet is similar to the second packet, discarding, by the processing device, the first packet.

Example 2 is the method of Example 1, further comprising: determining, by the processing device, whether the first virtualized execution environment satisfies a trust condition pertaining to the second virtualized execution environment, wherein determining whether the first virtualized execution environment satisfies the trust condition comprises determining whether the first virtualized execution environment and the second virtualized execution environment are associated with a same user; and responsive to determining that the first virtualized execution environment satisfies the trust condition, determining, by the processing device, whether the first packet has similar characteristics with the second packet.

Example 3 is the method of Examples 1-2, further comprising: accessing, by the processing device, a second filtering queue of the second virtualized execution environment, the second filtering queue storing at least a third packet; generating, by the processing device, a second filtering rule in view of characteristics of the third packet; and in response to determining that the first filtering rule and the second filtering rule match, performing, by the processing device, at least one of: installing the first filtering rule, or storing the first filtering rule in a data store to apply to subsequent packets addressed to the first virtualized execution environment and the second virtualized execution environment.

Example 4 is the method of Examples 1-3, further comprising, prior to receiving the first packet: generating, by the processing device, the first filtering rule in view of the characteristics of the second packet; and storing, by the processing device, the first filtering rule in a data store.

Example 5 is the method of Examples 1-4, further comprising: performing, by the processing device, at least one of: removing the first filtering rule after a first set period of time; or temporarily suspending the first filtering rule for a second set period of time.

Example 6 is the method of Examples 1-5, further comprising adding, by the processing device, metadata included with the first packet to the first filtering rule when the first filtering rule is generated, the metadata comprising a type of malicious packet.

Example 7 is the method of Examples 1-6, further comprising: storing, by the processing device, the first packet in a filtering queue of the first virtualized execution environment; receiving, by the processing device, a third packet addressed to a third virtualized execution environment, the third packet having similar characteristics with the first packet and the second packet; and responsive to receiving the third packet, discarding, by the processing device, the third packet.

Example 8 is a system, comprising: a memory; and a processing device coupled to the memory, the processing device to perform operations comprising: receiving a first packet addressed to a first virtualized execution environment; determining whether the first packet has similar characteristics with a second packet by applying a first filtering rule to the first packet, wherein the first filtering rule is generated in view of characteristics of the second packet, and wherein the second packet is stored in a first filtering queue of a second virtualized execution environment; and responsive to determining that the first packet is similar to the second packet, discarding the first packet.

Example 9 is the system of Example 8, wherein the operations further comprise: determining whether the first virtualized execution environment satisfies a trust condition pertaining to the second virtualized execution environment, wherein determining whether the first virtualized execution environment satisfies the trust condition comprises determining whether the first virtualized execution environment and the second virtualized execution environment are associated with a same user; and responsive to determining that the first virtualized execution environment satisfies the trust condition, determining whether the first packet has similar characteristics with the second packet.

Example 10 is the system of Examples 8-9, wherein the operations further comprise: accessing a second filtering queue of the second virtualized execution environment, the second filtering queue storing at least a third packet; generating a second filtering rule in view of characteristics of the third packet; and in response to determining that the first filtering rule and the second filtering rule match, performing at least one of: installing the first filtering rule, or storing the first filtering rule in a data store to apply to subsequent packets addressed to the first virtualized execution environment and the second virtualized execution environment.

Example 11 is the system of Examples 8-10, wherein the operations further comprise, prior to receiving the first packet: generating the first filtering rule in view of the characteristics of the second packet; and storing the first filtering rule in a data store.

Example 12 is the system of Examples 8-11, wherein the operations further comprise performing at least one of: removing the first filtering rule after a first set period of time; or temporarily suspending the first filtering rule for a second set period of time.

Example 13 is the system of Examples 8-12, wherein the operations further comprise adding metadata included with the first packet to the first filtering rule when the first filtering rule is generated, the metadata comprising a type of malicious packet.

Example 14 is the system of Examples 8-13, wherein the operations further comprise: storing the first packet in a filtering queue of the first virtualized execution environment; receiving a third packet addressed to a third virtualized execution environment, the third packet having similar characteristics with the first packet and the second packet; and responsive to receiving the third packet, discarding the third packet.

Example 15 is a non-transitory computer-readable medium storing instructions that, when executed, cause a processing device to perform operations including: receiving a first packet addressed to a first virtualized execution environment; determining whether the first packet has similar characteristics with a second packet by applying a first filtering rule to the first packet, wherein the first filtering rule is generated in view of characteristics of the second packet, and wherein the second packet is stored in a first filtering queue of a second virtualized execution environment; and responsive to determining that the first packet is similar to the second packet, discarding the first packet.

Example 16 is the non-transitory computer-readable media of Example 15, wherein the operations further comprise: determining whether the first virtualized execution environment satisfies a trust condition pertaining to the second virtualized execution environment, wherein determining whether the first virtualized execution environment satisfies the trust condition comprises determining whether the first virtualized execution environment and the second virtualized execution environment are associated with a same user; and responsive to determining that the first virtualized execution environment satisfies the trust condition, determining whether the first packet has similar characteristics with the second packet.

Example 17 is the non-transitory computer-readable media of Examples 15-16, wherein the operations further comprise: accessing a second filtering queue of the second virtualized execution environment, the second filtering queue storing at least a third packet; generating a second filtering rule in view of characteristics of the third packet; and in response to determining that the first filtering rule and the second filtering rule match, performing at least one of: installing the first filtering rule, or storing the first filtering rule in a data store to apply to subsequent packets addressed to the first virtualized execution environment and the second virtualized execution environment.

Example 18 is the non-transitory computer-readable media of Examples 15-17, wherein the operations further comprise, prior to receiving the first packet: generating the first filtering rule in view of the characteristics of the second packet; and storing the first filtering rule in a data store.

Example 19 is the non-transitory computer-readable media of Examples 15-18, wherein the operations further comprise performing at least one of: removing the first filtering rule after a first set period of time; or temporarily suspending the first filtering rule for a second set period of time.

Example 20 is the non-transitory computer-readable media of Examples 15-19, the operations further comprise: storing the first packet in a filtering queue of the first virtualized execution environment; receiving a third packet addressed to a third virtualized execution environment, the third packet having similar characteristics with the first packet and the second packet; and responsive to receiving the third packet, discarding the third packet.

Example 21 is an apparatus for filtering malicious packets, comprising: means for receiving a first packet addressed to a first virtualized execution environment; means for determining whether the first packet has similar characteristics with a second packet by applying a first filtering rule to the first packet, wherein the first filtering rule is generated in view of characteristics of the second packet, and wherein the second packet is stored in a filtering queue of a network interface card (NIC) of a second virtualized execution environment; and means for, responsive to determining that the first packet is similar to the second packet, discarding the first packet.

Example 22 is the apparatus of Example 21, further comprising: means for determining whether the first virtualized execution environment satisfies a trust condition pertaining to the second virtualized execution environment, wherein determining whether the first virtualized execution environment satisfies the trust condition comprises determining whether the first virtualized execution environment and the second virtualized execution environment are associated with a same user; and means for, responsive to determining that the first virtualized execution environment satisfies the trust condition, determining whether the first packet has similar characteristics with the second packet.

Example 23 is the apparatus of Examples 21-22, further comprising: means for accessing a second filtering queue of the second virtualized execution environment, the second filtering queue storing at least a third packet; means for generating a second filtering rule in view of characteristics of the third packet; and means for, in response to determining that the first filtering rule and the second filtering rule match, performing at least one of: installing the first filtering rule in a physical NIC, or storing the first filtering rule in a data store to apply to subsequent packets addressed to the first virtualized execution environment and the second virtualized execution environment.

Example 24 is the apparatus of Examples 21-23, further comprising means for, prior to receiving the first packet: accessing the first filtering queue; generating the first filtering rule in view of the characteristics of the second packet; and storing the first filtering rule in a data store.

Example 25 is the apparatus of Examples 21-24, further comprising means for performing at least one of: removing the first filtering rule after a first set period of time; or temporarily suspending the first filtering rule for a second set period of time.

Example 26 is the apparatus of Examples 21-25, further comprising means for adding metadata included with the first packet to the first filtering rule when the first filtering rule is generated, the metadata comprising a type of malicious packet.

Example 26 is a method, comprising: accessing, by a hypervisor executing by a processing device, a filtering queue that stores at least one packet determined to be malicious by a virtual machine; generating, by the hypervisor, a filtering rule in view of characteristics of the at least one packet determined to be malicious; and storing the filtering rule in a data store to apply to subsequent packets addressed to the virtual machine to determine whether any of the subsequent packets have similar characteristics with the at least one packet determined to be malicious.

Example 27 is the method of Example 26, further comprising: receiving, by the hypervisor, a subsequent packet addressed to the virtual machine; and in response to determining that the subsequent packet has similar characteristics with the at least one packet determined to be malicious, discarding the subsequent packet.

Example 28 is the method of Examples 26-27, further comprising applying the filtering rule to packets addressed to a second virtual machine that satisfies a trust condition with the virtual machine, the trust condition verifying whether the virtual machine and the second virtual machine belong to a same user.

Example 29 is the method of Examples 26-28, further comprising: accessing, by the hypervisor, a second filtering queue of a second virtual machine, the second filtering queue storing at least a second packet determined to be malicious by the second virtual machine; generating, by the hypervisor, a second filtering rule in view of characteristics of the second packet determined to be malicious; and in response to determining that the filtering rule and the second filtering rule match, installing the filtering rule in a physical network interface card (NIC) to apply to packets at the physical NIC to determine whether any of the packets have similar characteristics with the at least one packet and the second packet determined to be malicious.

Example 30 is the method of Examples 26-29, further comprising: accessing, by the hypervisor, a second filtering queue of a second virtual machine, the second filtering queue storing at least a second packet determined to be malicious by the second virtual machine, wherein the first virtual machine and the second virtual machine do not satisfy a trust condition; generating, by the hypervisor, a second filtering rule in view of characteristics of the second packet determined to be malicious; and in response to determining that the filtering rule and the second filtering rule match, storing the filtering rule in a data store to apply to subsequent packets addressed to the virtual machine and the second virtual machine to determine whether any of the subsequent packets have similar characteristics with the at least one packet and the second packet determined to be malicious.

Example 31 is the method of Examples 26-30, wherein the filtering queue is designated for packets flagged as malicious.

Example 32 is the method of Examples 26-31, wherein the filtering queue is in a virtual network interface card (NIC) of the virtual machine.

Example 33 is the method of Examples 26-32, further comprising: removing, by the hypervisor, the filtering rule after a predefined time period; and transmitting the subsequent packets to the virtual machine to facilitate determination of whether the subsequent packets are malicious.

Example 34 is the method of Examples 26-33, further comprising: temporarily suspending, by the hypervisor, the filtering rule for a set period of time; and sending the subsequent packets to the virtual machine to facilitate determination of whether the subsequent packets are malicious while the filtering rule is temporarily suspended.

Example 35 is the method of Examples 26-34, further comprising: adding metadata included with the packet to the filtering rule when the filtering rule is generated, the metadata comprising a type of malicious packet; and logging the discarding of any of the subsequent packets and the metadata in an event log.

Example 36 is the method of Examples 26-35, further comprising receiving, from the virtual machine, a signal comprising the packet and metadata included with the packet by the virtual machine, the metadata providing an indication that the packet is no longer flagged as malicious by the virtual machine.

Example 37 is the method of Examples 26-36, wherein an application on the virtual machine flags the packet as being malicious and adds the packet to the filtering queue.

Example 38 is a system, comprising: a memory; a processing device coupled to the memory, the processing device executing a hypervisor to: receive a packet that is addressed to a virtual machine; determine one or more characteristics of the packet; compare the one or more characteristics with a filtering rule created in view of a previous packet determined to be malicious by the virtual machine; and responsive to a determination that the one or more characteristics match the filtering rule, discard the packet.

Example 39 is the system of Example 38, wherein the processing device further executes the hypervisor to, responsive to a determination that the one or more characteristics do not match the filtering rule, transmit the packet to the virtual machine.

Example 40 is the system of Examples 38-39, wherein the filtering rule was created in view of the previous packet by accessing a filtering queue of the virtual machine to retrieve the previous packet, the filtering queue designated for packets determined to be malicious.

Example 41 is the system of Examples 38-40, wherein the processing device further executes the hypervisor to: remove the filtering rule after a predefined time period; receive a subsequent packet addressed to the virtual machine; and transmit the subsequent packet to the virtual machine without determining whether one or more characteristics of the subsequent packet match the filtering rule.

Example 42 is one or more tangible, non-transitory computer-readable media storing instructions that, when executed, cause one or more processing devices executing a virtual machine to: receive, at an application executing on the virtual machine, a packet from a hypervisor; determine that the packet is malicious; and add the packet to a filtering queue designated for malicious packets to cause subsequent packets that match one or more characteristics of the packet to be discarded before being provided to the virtual machine.

Example 43 is the computer-readable media of Example 42, wherein the one or more processing devices executing the virtual machine are further to: add metadata to the packet prior to adding the packet to the filtering queue, the metadata including at least a type of malicious packet.

Example 44 is the computer-readable media of Examples 42-43, wherein the one or more processing devices executing the virtual machine are further to: install an update to the application to eliminate malicious activity to be caused by the packet; add metadata to the packet, the metadata indicating that the packet is no longer malicious; and send a signal to the hypervisor including the packet with the metadata.

Example 45 is the computer-readable media of Examples 42-44, wherein the one or more processing devices executing the virtual machine are further to: store packets determined to be malicious in a data store of the virtual machine; and responsive to determining that a number of packets in the data store exceeds a threshold, add the packets in the data store to the filtering queue.

Example 46 is the computer-readable media of Examples 42-45, wherein the filtering queue is included in a virtual network interface card of the virtual machine.

Example 47 is a system, comprising: a physical network interface card; a memory; a processing device coupled to the memory and the physical network interface card, the processing device executing a hypervisor to: access a plurality of filtering queues of a plurality of virtual machines to retrieve a plurality of packets determined to be malicious by respective virtual machines; generate a plurality of filtering rules to apply to subsequent packets to determine whether to discard any of the subsequent packets that match at least one characteristic of the plurality of packets; and responsive to determining that a threshold number of the plurality of filtering rules are similar, install one of the plurality of filtering rules on the physical network interface card (NIC) to cause the physical NIC to discard the subsequent packets that match the at least one characteristic of the plurality of packets.

Example 48 is the system of Example 47, wherein the physical network interface card to: receive a subsequent packet; and responsive to determining that the subsequent packet matches the at least one characteristic of the plurality of packets, apply the rule to discard the subsequent packet.

Example 49 is the system of Examples 47-48, wherein the plurality of filtering queues are designated for packets flagged as malicious.

Example 50 is the system of Examples 47-49, wherein the plurality of filtering queues are each located in a virtual NIC of a respective virtual machine.

Example 51 is the system of Examples 47-50, wherein an application on each of the plurality of virtual machines flags a respective packet of the plurality of packets as malicious and adds the respective packet to a respective filtering queue of the plurality of filtering queues.

Example 52 is the system of Examples 47-51, wherein the application includes metadata in the respective packet prior to adding the respective packet to the respective filtering queue, the metadata indicating at least a type of malicious packet.

Example 53 is the system of Examples 47-52, wherein the processing device further executes the hypervisor to: remove the filtering rule from the physical network interface card after a predefined time period; receive the subsequent packets from the physical network interface card; and send the subsequent packets to the plurality of virtual machines to facilitate determinations of whether the subsequent packets are malicious.

Example 54 is an electronic device, comprising: a memory; a processing device coupled to the memory, the processing device executing a hypervisor to: access a filtering queue interfacing with a first virtual machine, the filtering queue designated for malicious packets and including at least one packet determined to be malicious by the first virtual machine; generate a filtering rule in view of one or more characteristics of the at least one packet; and apply the filtering rule to subsequent packets addressed to the first virtual machine and subsequent packets addressed to a second virtual machine to determine whether any of the subsequent packets addressed to the first virtual machine and any of the subsequent packets addressed to the second virtual machine are to be discarded.

Example 55 is the electronic device of Example 54, wherein the first virtual machine and the second virtual machine satisfy a trust condition that verifies whether the first virtual machine and the second virtual machine are owned by the same user.

Example 56 is the electronic device of Examples 54-55, wherein the processing device executing the hypervisor further to: disable the filtering rule after a predefined time period; and allow the subsequent packets to be sent to the second virtual machine without applying the filtering rule.

Example 57 is the electronic device of Examples 54-56, wherein the hypervisor is executing the first virtual machine and the second virtual machine.

Example 58 is the electronic device of Examples 54-57, wherein the filtering queue is included in a virtual network interface card of the first virtual machine.

Example 59 is an apparatus for filtering malicious packets, comprising: means for generating a filtering rule based on one or more characteristic of a packet retrieved from a filtering queue, the packet determined to be malicious by a virtual machine; means for applying the filtering rule to a first subset of subsequent packets to determine whether to discard any of the first subset of subsequent packets that match the one or more characteristics of the packet determined to be malicious by the virtual machine; means for disabling the filtering rule after a predefined time period; and means for allowing a second subset of subsequent packets without applying the filtering rule to facilitate a determination of whether the second subset of subsequent packets are malicious.

Example 60 is the apparatus of Example 59, further comprising: means for generating a second filtering rule based on one or more characteristic of a second packet retrieved from a second filtering queue, the second packet determined to be malicious by a second virtual machine; and means for, in response to determining that the filtering rule and the second filtering rule are similar, installing the filtering rule in a physical network interface card to apply the filtering rule to determine whether to discard packets received from the network that match the one or more characteristics.

Example 61 is the apparatus of Examples 59-60, further comprising: means for applying the filtering rule to packets addressed to a second virtual machine to determine whether any of the packets match the one or more characteristics of the packet determined to be malicious are to be discarded.

What is claimed is:

1. A method, comprising:

receiving, by a hypervisor that manages a first virtualized execution environment and a second virtualized execution environment and that is executed by a processing device, a first packet addressed to the first virtualized execution environment;

determining, by the hypervisor executed by the processing device, whether the first packet has similar characteristics with a second packet by applying a first filtering rule to the first packet, wherein the first filtering rule is generated by the hypervisor in view of characteristics of the second packet by accessing a second filtering queue within a second virtual network interface card (NIC) of the second virtualized execution environment that stores the second packet, and wherein the second virtualized execution environment stores the second packet in the second filtering queue based on a determination by a second application of the second virtualized execution environment that the second packet is malicious;

responsive to determining that the first packet is similar to the second packet, discarding, by the hypervisor executed by the processing device, the first packet;

accessing, by the hypervisor, a first filtering queue within a first virtual NIC of the first virtualized execution environment to obtain a fourth packet, the fourth packet stored in the first filtering queue based on a determination by a first application of the first virtualized execution environment that the fourth packet is malicious;

generating, by the hypervisor in view of characteristics of the fourth packet, a third filtering rule based on the fourth packet;

determining a threshold number of similar filtering rules is exceeded based on a determination the third filtering rule is similar to the first filtering rule and a second filtering rule;

adding at least one of the first filtering rule, the second filtering rule, or the third filtering rule to a physical NIC of a host associated with the hypervisor based on determining the threshold number of similar filtering rules is exceeded; and configuring the physical NIC to apply the at least one of the first filtering rule, the second filtering rule, or the third filtering rule added to the physical NIC.

2. The method of claim 1, further comprising:

determining, by the processing device, whether the first virtualized execution environment satisfies a trust condition pertaining to the second virtualized execution environment, wherein determining whether the first virtualized execution environment satisfies the trust condition comprises determining whether the first virtualized execution environment and the second virtualized execution environment are associated with a same user; and responsive to determining that the first virtualized execution environment satisfies the trust condition, determining, by the processing device, whether the first packet has the similar characteristics with the second packet.

3. The method of claim 1, further comprising:

accessing, by the processing device, the second filtering queue of the second virtualized execution environment, the second filtering queue storing at least a third packet;

generating, by the processing device, the second filtering rule in view of characteristics of the third packet; and in response to determining that the first filtering rule and the second filtering rule match, performing, by the processing device, at least one of: installing the first filtering rule, or storing the first filtering rule in a data store to apply to subsequent packets addressed to the first virtualized execution environment and the second virtualized execution environment.

4. The method of claim 1, further comprising, prior to receiving the first packet:

generating, by the processing device, the first filtering rule in view of the characteristics of the second packet; and storing, by the processing device, the first filtering rule in a data store.

5. The method of claim 1, further comprising performing, by the processing device, at least one of:

removing the first filtering rule after a first set period of time; or temporarily suspending the first filtering rule for a second set period of time.

6. The method of claim 1, further comprising:

adding, by the processing device, metadata included with the first packet to the first filtering rule when the first filtering rule is generated, the metadata comprising a type of malicious packet.

7. The method of claim 1, further comprising:

storing, by the processing device, the first packet in the first filtering queue of the first virtual NIC of the first virtualized execution environment;

receiving, by the processing device, a third packet addressed to a third virtualized execution environment, the third packet having similar characteristics with the first packet and the second packet; and responsive to receiving the third packet, discarding, by the processing device, the third packet.

8. A system comprising:

a memory; and a processing device coupled to the memory, the processing device to:

receive, by a hypervisor that manages a first virtualized execution environment and a second virtualized execution environment and that is executed by the processing device, a first packet addressed to the first virtualized execution environment;

determine, by the hypervisor, whether the first packet has similar characteristics with a second packet by applying a first filtering rule to the first packet, wherein the first filtering rule is generated by the hypervisor in view of characteristics of the second packet by accessing a second filtering queue within a second virtual network interface card (NIC) of the second virtualized execution environment that stores the second packet, wherein the second virtualized execution environment stores the second packet in the second filtering queue based on a determination by a second application of the second virtualized execution environment that the second packet is malicious, and wherein the second filtering queue is designated for malicious packets and provides an interface between a virtualization section of a host and the second virtualized execution environment;

responsive to a determination that the first packet is similar to the second packet, discard, by the hypervisor, the first packet;

access, by the hypervisor, a first filtering queue within a first virtual NIC of the first virtualized execution environment to obtain a fourth packet, the fourth packet stored in the first filtering queue based on a determination by a first application of the first virtualized execution environment that the fourth packet is malicious;

generate, by the hypervisor in view of characteristics of the fourth packet, a third filtering rule based on the fourth packet;

determine a threshold number of similar filtering rules is exceeded based on a determination the third filtering rule is similar to the first filtering rule and a second filtering rule;

add at least one of the first filtering rule, the second filtering rule, or the third filtering rule to a physical NIC of a host associated with the hypervisor based on determining the threshold number of similar filtering rules is exceeded; and configure the physical NIC to apply the at least one of the first filtering rule, the second filtering rule, or the third filtering rule added to the physical NIC.

9. The system of claim 8, wherein the processing device is further to:

determine whether the first virtualized execution environment satisfies a trust condition pertaining to the second virtualized execution environment, wherein to determine whether the first virtualized execution environment satisfies the trust condition, the processing device is to determine whether the first virtualized execution environment and the second virtualized execution environment are associated with a same user; and responsive to a determination that the first virtualized execution environment satisfies the trust condition, determine whether the first packet has the similar characteristics with the second packet.

10. The system of claim 8, wherein the processing device is further to:

access the second filtering queue of the second virtualized execution environment, the second filtering queue storing at least a third packet;

generate the second filtering rule in view of characteristics of the third packet; and in response to a determination that the first filtering rule and the second filtering rule match, perform at least one of: install the first filtering rule, or store the first filtering rule in a data store to apply to subsequent packets addressed to the first virtualized execution environment and the second virtualized execution environment.

11. The system of claim 8, wherein prior to the reception of the first packet, the processing device is further to:

generate the first filtering rule in view of the characteristics of the second packet; and store the first filtering rule in a data store.

12. The system of claim 8, wherein the processing device is further to perform at least one of:

remove the first filtering rule after a first set period of time; or temporarily suspend the first filtering rule for a second set period of time.

13. The system of claim 8, wherein the processing device is further to:

add metadata included with the first packet to the first filtering rule when the first filtering rule is generated, the metadata comprising a type of malicious packet.

14. The system of claim 8, wherein the processing device is further to:

store the first packet in the first filtering queue of the first virtual NIC of the first virtualized execution environment;

receive a third packet addressed to a third virtualized execution environment, the third packet having similar characteristics with the first packet and the second packet; and responsive to the reception of the third packet, discard the third packet.

15. A non-transitory computer-readable medium storing instructions that, when executed by a processing device, cause the processing device to:

receive, by a supervisor that manages a first virtualized execution environment and a second virtualized execution environment and that is executed by the processing device, a first packet addressed to the first virtualized execution environment;

determine, by the supervisor, whether the first packet has similar characteristics with a second packet by applying a first filtering rule to the first packet, wherein the first filtering rule is generated by the supervisor in view of characteristics of the second packet by accessing a second filtering queue within a second software network interface card (NIC) of the second virtualized execution environment that stores the second packet, wherein the second virtualized execution environment stores the second packet in the second filtering queue based on a determination by a second application of the second virtualized execution environment that the second packet is malicious, and wherein the second filtering queue is designated for malicious packets and provides an interface between a virtualization section of a host and the second virtualized execution environment;

responsive to a determination that the first packet is similar to the second packet, discard, by the supervisor, the first packet;

access, by the supervisor, a first filtering queue within a first virtual NIC of the first virtualized execution environment to obtain a fourth packet, the fourth packet stored in the first filtering queue based on a determination by a first application of the first virtualized execution environment that the fourth packet is malicious;

generate, by the supervisor in view of characteristics of the fourth packet, a third filtering rule based on the fourth packet;

determine a threshold number of similar filtering rules is exceeded based on a determination the third filtering rule is similar to the first filtering rule and a second filtering rule; and add at least one of the first filtering rule, the second filtering rule, or the third filtering rule to a physical NIC of a host associated with the supervisor based on determining the threshold number of similar filtering rules is exceeded; and configure the physical NIC to apply the at least one of the first filtering rule, the second filtering rule, or the third filtering rule added to the physical NIC.

16. The non-transitory computer-readable medium of claim 15, wherein the instructions, when executed by the processing device, cause the processing device further to:

determine whether the first virtualized execution environment satisfies a trust condition pertaining to the second virtualized execution environment, wherein to determine whether the first virtualized execution environment satisfies the trust condition, the instructions, when executed by the processing device, cause the processing device to determine whether the first virtualized execution environment and the second virtualized execution environment are associated with a same user; and responsive to a determination that the first virtualized execution environment satisfies the trust condition, determine whether the first packet has the similar characteristics with the second packet.

17. The non-transitory computer-readable medium of claim 15, wherein the instructions, when executed by the processing device, cause the processing device further to:

access the second filtering queue of the second virtualized execution environment, the second filtering queue storing at least a third packet;

generate the second filtering rule in view of characteristics of the third packet; and in response to a determination that the first filtering rule and the second filtering rule match, perform at least one of: install the first filtering rule, or store the first filtering rule in a data store to apply to subsequent packets addressed to the first virtualized execution environment and the second virtualized execution environment.

18. The non-transitory computer-readable medium of claim 15, wherein prior to the reception of the first packet, the instructions, when executed by the processing device, cause the processing device further to:

generate the first filtering rule in view of the characteristics of the second packet; and store the first filtering rule in a data store.

19. The non-transitory computer-readable medium of claim 15, wherein the instructions, when executed by the processing device, cause the processing device to further perform at least one of:

remove the first filtering rule after a first set period of time; or temporarily suspend the first filtering rule for a second set period of time.

20. The non-transitory computer-readable medium of claim 15, wherein the instructions, when executed by the processing device, cause the processing device further to:

store the first packet in the first filtering queue of the first virtual NIC of the first virtualized execution environment;

receive a third packet addressed to a third virtualized execution environment, the third packet having similar characteristics with the first packet and the second packet; and responsive to the reception of the third packet, discard the third packet.

* * * * *